United States Patent [19]
Ender et al.

[11] Patent Number: 6,052,135
[45] Date of Patent: Apr. 18, 2000

[54] COMBINATION ERASE BAR AND BELT POSITION DETECTOR SYSTEM FOR USE WITH AN ELECTROPHOTOGRAPHIC IMAGING SYSTEM

[75] Inventors: David A. Ender; Robert E. Brenner, Jr., both of New Richmond, Wis.; Harold D. Kracht, Stillwater; Mary Poppendieck, Eden Prairie, both of Minn.

[73] Assignee: Imation Corp., Oakdale, Minn.

[21] Appl. No.: 09/157,633

[22] Filed: Sep. 21, 1998

[51] Int. Cl.$^7$ ..................................................... B41J 2/385
[52] U.S. Cl. ................................. 347/116; 226/3; 226/15; 250/559.36; 347/234; 347/248; 399/165
[58] Field of Search ..................................... 399/162, 165, 399/167, 128, 301, 186, 187; 226/3, 15, 45, 20; 347/116, 234, 248; 250/231.1, 559.36

[56] References Cited

U.S. PATENT DOCUMENTS

| | | | |
|---|---|---|---|
| 4,561,761 | 12/1985 | Fox | 399/187 |
| 4,806,975 | 2/1989 | Godlove et al. | 399/187 |
| 5,510,877 | 4/1996 | DeJong et al. | 399/165 |
| 5,631,994 | 5/1997 | Appledorn et al. | 385/147 |
| 5,737,003 | 4/1998 | Moe et al. | 399/165 |
| 5,765,084 | 6/1998 | Asada et al. | 399/302 |
| 5,783,343 | 7/1998 | Tombs et al. | 399/296 |
| 5,978,003 | 11/1999 | Brenner, Jr. | 347/116 |

FOREIGN PATENT DOCUMENTS 4-16979  1/1992  Japan.

*Primary Examiner*—William Royer
*Assistant Examiner*—William A. Noe
*Attorney, Agent, or Firm*—William D. Bauer

[57] ABSTRACT

An electrophotographic imaging system including a combination erase and belt position detection system which may be employed for belt registration or image registration. In one embodiment, the system includes an erase bar having a pattern of light extending longitudinally across a photoconductor belt being moved in a first direction forming a transport path, wherein the erase bar is substantially perpendicular to the first direction. A photodetector is disposed adjacent the photoconductor belt, wherein the photodetector is responsive to light from the erase bar and provides a belt position signal representative of the position of the photoconductor belt relative to the continuous transport path, in a direction substantially perpendicular to the first direction. The belt position signal may be employed for belt steering or modulation of a laser beam representative of latent images to be scanned on the photoconductor belt. In one preferred application, the erase bar employs an optical fiber and light extraction mechanism for uniform radial light extraction and controlled radial and longitudinal light extraction along its length.

51 Claims, 15 Drawing Sheets

COMBINATION ERASE BAR AND BELT POSITION DETECTOR SYSTEM FOR USE WITH AN ELECTROPHOTOGRAPHIC IMAGING SYSTEM

FIELD OF THE INVENTION

The present invention relates to electrophotographic multi-color imaging systems, and more particularly, to a system that uses a single erase bar to remove charge from (i.e., erase) a photoconductor belt and detect deviation of the moving photoconductor belt relative to a continuous transport path for belt registration and/or registration of color separation images on the photoconductor belt.

BACKGROUND OF THE INVENTION

Light-based erase bars are used for discharging photoconductor belts in electrophotographic imaging systems. In multi-color electrophotographic imaging systems, latent images are formed in an imaging region of a moving photoconductor belt. Each of the latent images is representative of one of a plurality of different color separation images. The color separation images together define an overall multi-color image. The color separation images may define, for example, yellow, magenta, cyan, and black components that, upon subtractive combination on output media, produce a visible representation of the multi-color image. Prior to an imaging cycle, any charge remaining on the surface or in the photoconductor from a previous imaging operation must be uniformly discharged, typically by using a light-based erase bar. A uniform charge is next applied to the surface of the photoconductor.

Each of the latent images is formed by scanning a modulated laser beam across the moving photoconductor to selectively discharge the photoconductor in an image-wise pattern. Appropriately colored developers are applied to the photoconductor after each latent image is formed to develop the latent images. The resulting color separation images ultimately are transferred to the output media to form the multi-color image.

In some electrophotographic imaging systems, the latent images are formed and developed on top of one another in a common imaging region of the photoconductor. The latent images can be formed and developed in multiple passes of the photoconductor around a continuous transport path (i.e., a multi-pass system). Alternatively, the latent images can be formed and developed in a single pass of the photoconductor around the continuous transport path. A single-pass system enables multi-color images to be assembled at extremely high speeds relative to the multi-pass system. An example of an electrophotographic imaging system configured to assemble a multi-color image in a single pass of a photoconductor is disclosed in co-pending U.S. patent application Ser. No. 08/537,296 to Kellie et al., filed Sep. 29, 1995, and entitled "METHOD AND APPARATUS FOR PRODUCING A MULTI-COLORED IMAGE IN AN ELECTROPHOTOGRAPHIC SYSTEM".

In an electrophotographic imaging system as described above, the electrophotographic process requires several steps to be performed in a cyclic fashion to reproduce the images. Performance of these process steps can leave the photoconductor in a state of electric charge distribution that affects subsequent process cycles. This may result in previously processed images showing up as part of subsequent images, typically referred to as ghost images. In addition, accumulated charge at localized sites on the photoconductor can generate extremely high local electric fields that create regions of non-uniform conductivity and even dielectric breakdown, thus shortening the life time of the photoconductor.

By incorporating an erase step into the process, any charge remaining on the surface or trapped within the photoconductor from the previous imaging operation is uniformly discharged. The result is that the electric charge distribution induced from the previous imaging and developing cycle is uniformly reduced, reducing ghosting and increasing the life of the photoconductor belt.

The erase step is typically accomplished using any of a variety of "erase bars". In one approach, a linear array of light emitting diodes is used as a light source for removing charge from the photoconductor. The diodes are selected so that their emission wavelength matches the spectral response of the photoconductor (i.e., photoreceptor). The diodes typically are required to be spaced every inch or closer, depending on their operating characteristics. Because of diode-to-diode differences in operating characteristics, a "balancing" circuit is often times necessary to tune the current to each diode to achieve a more uniform electrophotographic discharge or erase. In addition, other circuitry is often required to detect single diode failures. Undetected failures of one or more light emitting diodes often leads to linear defects in the images that appear with continued cycling.

In another approach, a broad band linear incandescent source is used as an erase bar. However, this approach often introduces unwanted heat into the electrophotographic imaging system. In another approach, a fluorescent light source may be used. Both incandescent and fluorescent light sources may introduce unwanted wavelengths which cause photochemical reactions in the photoreceptors. While these photochemical reactions can be filtered against, the use of filtering devices results in additional costs to the electrophotographic imaging system.

In the above electrophotographic imaging system, the latent images must be formed in precise registration with one another to produce a high quality color image. In systems incorporating a photoconductor belt, precise registration can be difficult due to deviation of the belt from a transport path in a direction perpendicular to the transport path. Specifically, the photoconductor belt can undergo side-to-side movement (i.e., belt walking) during travel. The imaging region in which the latent images are formed is commonly fixed relative to the edge of the photoconductor belt. However, the scanning beam used to form each latent image on the imaging region is fixed relative to a start-of-scan coordinate. The side-to-side movement or belt walking of the photoconductor belt can cause movement of the imaging region relative to the start-of-scan coordinate. As a result, misregistration can occur between different scan lines and between different latent images. This misregistration can significantly degrade image quality. In particular, the misregistration can produce visible artifacts in the final multi-color image upon transfer of the misregistered color separation images to the output media.

Solutions to eliminate misregistration (i.e., belt misregistration and/or image misregistration) which are incorporated into electrophotographic imaging systems often require an additional optical source and power supply to detect the side-to-side movement of the photoconductor belt. The use of additional components however may not be desirable because they add cost and complexity to the electrophotographic imaging system. The use of additional components may also reduce overall system reliability.

SUMMARY OF THE INVENTION

The present invention provides a combination belt erase and belt registration system, and an electrophotographic imaging system incorporating a combination belt erase and belt registration system. The present invention includes a common light source for both belt erase and belt position detection.

In one exemplary embodiment, the present invention provides a system for registration of a photoconductor belt for use in an electrophotographic imaging system. The photoconductor belt is moved in a first direction forming a transport path, the photoconductor belt tending to deviate from the transport path in a direction substantially perpendicular to the first direction. The system includes an erase bar having a pattern of light extending laterally across the photoconductor belt substantially perpendicular to the first direction. A photodetector is disposed adjacent the photoconductor belt, wherein the photodetector is responsive to the light from the erase bar and provides a belt position signal representative of the position of the photoconductor belt relative to the continuous transport path, in a direction substantially perpendicular to the first direction. A belt steering mechanism is operably coupled to the photoconductor belt for adjusting movement of the photoconductor belt in the direction substantially perpendicular to the first direction. A belt steering controller is responsive to the belt position signal for controlling the belt steering mechanism based on the belt position signal to reduce deviation of the photoconductor belt from the transport path.

In one application, the photodetection mechanism detects the position of the edge of the photoconductor belt. As such, the photodetector extends from an edge of the photoconductor belt. The erase bar includes a first portion overlapping an edge of the photoconductor belt opposite the photodetector, wherein the first portion is in optical alignment with the photodetector.

In one embodiment, the erase bar includes an optical fiber. A light source is operably coupled to the optical fiber. A uniform light extraction mechanism is operably coupled to the optical fiber along its length. In one preferred embodiment, the uniform light extraction mechanism is an overlay light extraction mechanism which may include light extraction tape.

Optionally, the light source may comprise a laser diode, a light emitting diode, an incandescent light or a fluorescent light. The light source may be pulsed, and may be coupled to a pulse generator. In one application, the pulsed light source is pulsed at a frequency different than 60 Hertz, and more preferably, at a frequency greater than 60 Hertz.

In one embodiment, the system includes a plurality of rollers, wherein the photocondutor belt moves along the transport path about the plurality of rollers. The belt steering mechansim includes a roller adjustment mechanism for adjusting a position of one of the rollers, wherein the photoconductor belt tends to move in the direction substantially perpendicular to the first direction in response to the adjustment of the position of one of the rollers.

In another embodiment, the present invention includes a system for registration of a latent image on a photoconductor belt, wherein the photoconductor belt is moved in a first direction forming a transport path, and wherein the photoconductor belt tends to deviate from the transport path in a direction substantially perpendicular to the first direction. The system includes a scanner for scanning a laser beam across the photoconductor belt. A scan controller is provided for modulating the laser beam based on image data to form the latent image on the photoconductor belt. An erase bar having a pattern of light extending longitudinally across the photoconductor belt and substantially perpendicular to the first direction. A photodetector is disposed adjacent the photoconductor belt, wherein the photodetector is responsive to the light from the erase bar and provides a belt position signal representative of the position of the photoconductor belt relative to the continuous transport path in a direction substantially perpendicular to the first direction.

In one application, the scan controller is responsive to the belt position signal and modulates the laser beam based on the belt position signal for registration of the latent images on the photoconductor belt. In another application, a belt steering controller is responsive to the belt position signal for controlling a belt steering mechanism based on the belt position signal to reduce deviation of the photoconductor belt from the transport path.

In one aspect, the erase bar includes an optical fiber. A light source is operably coupled to the optical fiber. Further, a uniform light extraction mechanism is operably coupled to the optical fiber along its length allowing for uniform controlled radial extraction of light from the optical fiber. In one embodiment, the uniform light extraction mechanism is light extraction tape.

In another embodiment, the present provides an erase apparatus for use in reducing photoconductor charge in an image reproduction system including a photoconductor having an imaging region. The apparatus includes an optical fiber having a first end and a second end. The optical fiber extends laterally across the imaging region in a direction substantially perpendicular to the direction of movement of the photoconductor. The optical fiber includes a first section facing the photoconductor and a second section adjacent the first section. A first light source is operably coupled to the optical fiber at the first end. A light extraction mechanism is operably coupled to the optical fiber along its length at the second section for redirecting light propagating through the optical fiber radially from the optical fiber through the second section onto the photoconductor.

In one aspect, the light extraction mechanism comprises an overlay, which in one embodiment includes a light extraction tape. In another aspect, the light extraction mechanism is formed integral with the optical fiber. A second light source or a reflector mechanism may be operably coupled to the optical fiber at the second end.

In one aspect, the image reproduction system is an electrophotographic imaging system. In another aspect, the image reproduction system is a copier. In one preferred embodiment, the controlled light distribution is uniform across the photoconductor. The light extraction mechanism includes a structured surface, wherein the structured surface, operates to control light distribution on the photoconductor. The structured surface may include a plurality of optical elements across the light extraction mechanism. In one aspect, the optical elements are equally spaced across the light extraction mechanism. Another aspect, the light extraction mechanism includes a first end, a second end, and a central portion, wherein the optical elements are spaced further apart near the first end and the second end relative to the spacing of the optical elements in the central portion. In yet another aspect, the light extraction mechanism includes a first end, a second end, and a central portion, wherein the optical elements are shorter in length near the first end and the second end relative to the length of the optical elements in the central portion.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention.

DETAILED DESCRIPTION OF THE PREFERRED EMBODIMENTS

The present invention provides a combination belt erase and belt registration system, and an electrophotographic imaging system incorporating a combination belt erase and belt registration system. A common light source is used for belt erase (i.e., removing charge from a photoconductor belt) and belt position detection.

The light source extends over a photodetector positioned adjacent the photodetector belt. The light source may comprise any of a variety of point or linear light sources employed as "erase bars", including linear arrays of light emitting diodes, broad band incandescent light, or fluorescent light tubes as previously indicated herein. In one application, the light source extends over an edge of the photoconductor belt in optical alignment with a photodetector as part of a belt edge position detection system. The belt edge detection system detects deviation of the moving photoconductor belt relative to a continuous transport path as part of a registration system which can include belt registration and/or registration of color separation images on a photoconductor belt. The registration system includes a belt steering control system for steering the photoconductor belt based on the detected position to reduce deviation of the photoconductor belt from the continuous transport path. The registration system may incorporate a scan control system for controlling the laser beams scanned by image scanners based on the detected position. The combination belt erase and belt registration system in accordance with the present invention is not limited to use with a belt edge position detection system, and can be used with other light based belt position detection systems.

Figure 1:
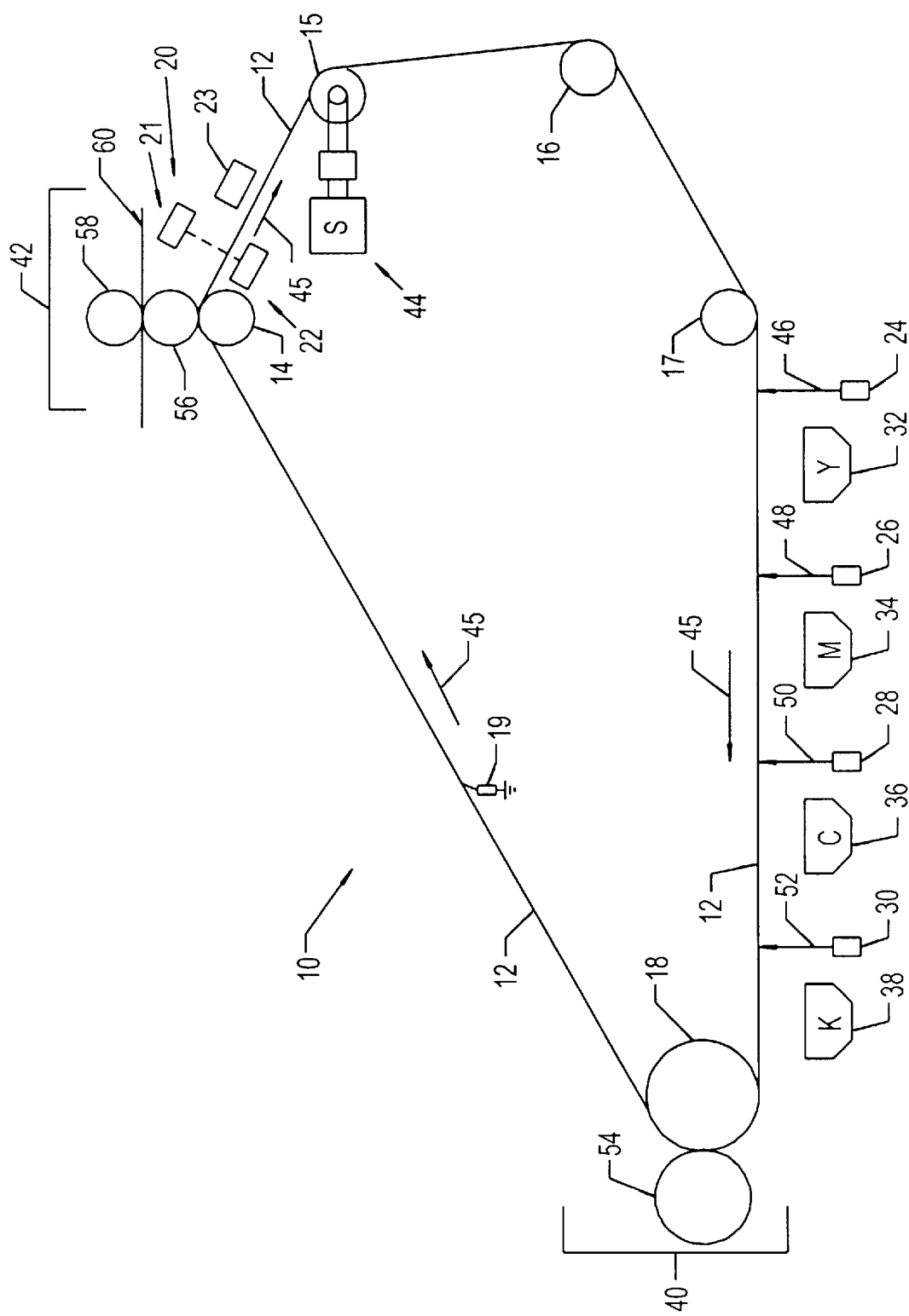
FIG. 1 is a schematic diagram conceptually illustrating an exemplary electrophotographic imaging system, including a combination belt erase and belt registration system, in accordance with the present invention.

FIG. 1 is a schematic diagram conceptually illustrating an exemplary electrophotographic imaging system 10 having a combination erase bar and belt position detection system in accordance with the present invention. In the example of FIG. 1, imaging system 10 includes a photoconductor belt 12 mounted about a plurality of rollers 14, 15, 16, 17, 18, a grounding brush 19, a combination erase and belt position detection system 20, including an erase station 21 and belt position detection system 22, a charging station 23, a plurality of scanners 24, 26, 28, 30, a plurality of development stations 32, 34, 36, 38, a drying station 40, a transfer station 42, and a belt steering system 44. The imaging system 10 forms a multi-color image in a single pass of photoconductor belt 12 around a continuous transport path. An imaging system capable of assembling a multi-color image in a single pass of a photoconductor is disclosed, for example, in co-pending U.S. patent application Ser. No. 08/537,296 to Kellie et al., filed Sep. 29, 1995, and entitled "METHOD AND APPARATUS FOR PRODUCING A MULTI-COLORED IMAGE IN AN ELECTROPHOTOGRAPHIC SYSTEM". The entire content of the above-referenced patent application is incorporated herein by reference. Optionally, imaging system 10 may be a multi-pass electrophotographic imaging system.

In operation of system 10, photoconductor belt 12 is driven to travel in a first direction indicated by arrows 45 along a continuous transport path. As photoconductor belt 12 moves along the transport path, erase station 21 uniformly discharges any charge remaining on the belt from a previous imaging operation. Grounding brush 19 mechanically couples the ground plane of photoconductor belt 12 to ground potential. As known in the art, in a dark environment, photoconductor belt 12 is an electrical insulator. When exposed to light by erase station 21 at a correct wavelength, photoconductor belt 12 becomes partially conductive such that charge remaining on photoconductor belt 12 may be discharged to ground through grounding brush 19.

Photoconductor belt 12 then encounters charging station 23, which uniformly charges the belt to a predetermined level. The scanners 24, 26, 28, 30 selectively discharge an imaging region of photoconductor belt 12 with laser beams 46, 48, 50, 52, respectively, to form latent electrostatic images. Each latent image is representative of one of a plurality of color separation images.

As shown in FIG. 1, each development station 32, 34, 36, 38 is disposed after one of scanners 24, 26, 28, 30, relative to the direction 45 of movement of photoconductor belt 12. Each of development stations 32, 34, 36, 38 applies a developer having a color appropriate for the color separation image represented by the particular latent image formed by the preceding scanner 24, 26, 28, 30. In the example of FIG. 1, development stations 32, 34, 36, 38 apply yellow (Y), magenta (M), cyan (C), and black developers (K), respectively, to photoconductor belt 12. A suitable developer is disclosed, for example, in U.S. Pat. No. 5,652,282 (issued Jul. 29, 1997, to Baker et al.) entitled "LIQUID INK USING A GEL ORGANOSOL". The entire content of the above-referenced patent application is incorporated herein by reference.

As photoconductor belt 12 continues to move in direction 45, the next scanner 26, 28, 30 begins to form a latent image in the imaging region in registration with the latent image formed by the preceding scanner and developed by the preceding development station 32, 34, 36. Thus, the color separation images are formed in registration on top of one another in the same imaging region. The scanners 24, 26, 28, 30 and development stations 32, 34, 36, 38 may be spaced such that an entire latent image is formed and developed prior to formation and development of the next latent image. For increased speed and reduced size, however, each scanner 26, 28, 30 and development station 34, 36, 38 preferably begins formation and development of the next latent image prior to complete formation and development of the preceding latent image.

After scanners 24, 26, 28, 30 and development stations 32, 34, 36, 38 have formed and developed the latent images, the imaging region of the moving photoconductor belt 12 encounters drying station 40. The drying station 40 may include a heated roller 54 that forms a nip with belt roller 18. The heated roller 54 applies heat to photoconductor belt 12 to dry the developed image applied by development stations 32, 34, 36, 38. The imaging region of photoconductor belt 12 next arrives at transfer station 42. The transfer station 42 includes an intermediate transfer roller 56 that forms a nip with photoconductor belt 12 over belt roller 14 and a pressure roller 58 that forms a nip with the intermediate transfer roller 56. The developed image on photoconductor belt 12 transfers from the photoconductor belt surface to intermediate transfer roller 56 by selective adhesion. The pressure roller 58 serves to transfer the image on intermediate transfer roller 56 to an output substrate 60 by application of pressure and/or heat to the output substrate. The output substrate 60 may comprise, for example, paper or film.

The present invention includes a unique combination erase and belt position detection system which uses a common light source for reducing charge on/in the photoconductor belt, such that the charge is reduced to a uniform residual potential (preferably, zero or near zero volts) and for a belt position detection system. Belt position detection system 22 and belt steering system 44 operate to provide a system for belt registration and/or registration of color separation images on the photoconductor belt 12. In particular, the registration system of the present invention includes belt position detection system 22 utilizing erase station 21, for detecting a position of the photoconductor belt 12 relative to a desired continuous transport path. Based on the detected position, the registration system may perform two different functions to ensure precise registration of the color separation images.

First, belt steering system 44 steers photoconductor belt 12 (in a direction perpendicular to belt travel) based on the detected position of photoconductor belt 12 to reduce deviation of the belt from the continuous transport path. In one exemplary embodiment, the belt steering system 44 is operably (e.g., mechanically) coupled to the roller 15 which functions to correct the positioning of photoconductor belt 12.

Second, the registration system may incorporate a scan control system for controlling laser beams 46, 48, 50, 52 scanned by scanners 24, 26, 28, 30 based on the detected position of photoconductor belt 12 by belt position detection system 23. In one exemplary embodiment, the scan control system controls modulation of each laser beam 46, 48, 50, 52 based on the detected position to start each of the image scan segments at a fixed distance relative to a detected edge of photoconductor belt 12. By controlling belt steering and/or laser beam scanning, the registration system of the present invention maintains the image quality of the multi-color image upon transfer of the registered color separation images to the output substrate (media) 60.

Figure 2:
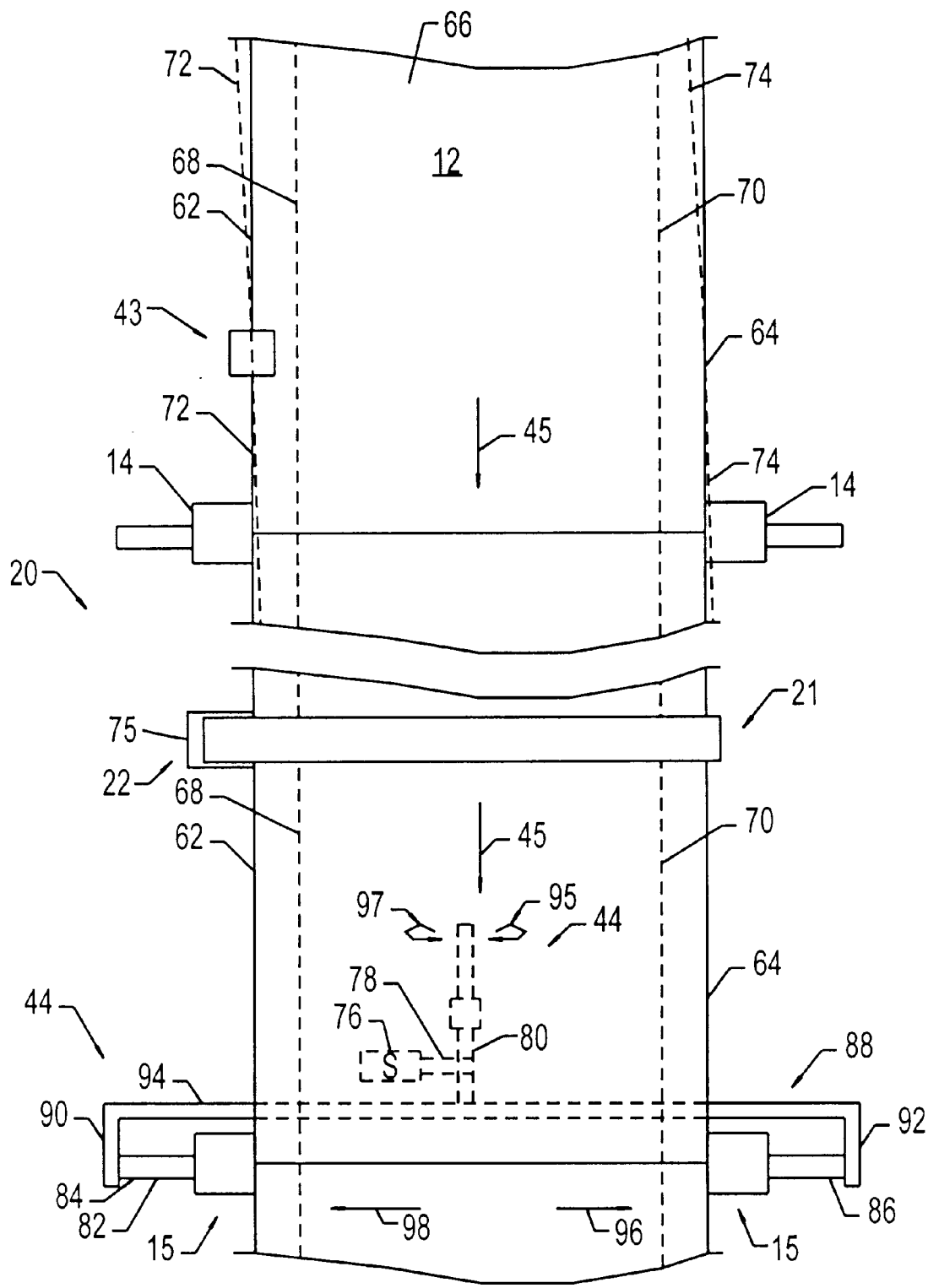
FIG. 2 is a partial plan view of the combination exemplary belt erase and belt registration system used in the electrophotographic imaging system of FIG. 1.

FIG. 2 is a top plan view of an exemplary photoconductor belt 12 for use in electrophotographic imaging system 10 of FIG. 1, showing one embodiment of the combination erase and belt position detection system 20 in accordance with the present invention. As shown in FIG. 2, photoconductor belt 12 includes a left belt edge 62 and a right belt edge 64. The photoconductor belt 12 also includes an imaging region 66. The imaging region 66 includes a left margin 68 positioned at a fixed distance relative to left belt edge 62, and a right margin 70 positioned at a fixed distance relative to right belt edge 64. The left and right margins 68, 70 define the width of imaging region 66 extending in a direction perpendicular to the direction 45 of movement of photoconductor belt 12. The imaging region 66 also has a length defined by top and bottom margins not shown in FIG. 2.

Each scanner 24, 26, 28, 30 is oriented to scan the respective laser beam 46, 48, 50, 52 across the width of imaging region 66 in a scan line. Movement of photoconductor belt 12 in direction 45 (substantially perpendicular) relative to each scanner 24, 26, 28, 30 produces a plurality of scan lines on the photoconductor belt 12. The laser beam is modulated based on image data representative of the latent image such that each of the scan lines includes an image scan segment. The image scan segments ideally extend between the left and right margins 68, 70 and together form a latent image in imaging region 66. The first and second belt edges 62, 64 ideally extend parallel to direction 45 of movement of photoconductor belt 12. As indicated by dashed lines 72, 74, however, photoconductor belt 12 can walk or move from side to side during travel in direction 45, deviating slightly from the transport path.

To produce a high quality image, the latent images formed by scanners 24, 26, 28, 30 must be formed in precise registration with one another in imaging region 66. Precise registration can be difficult due to belt walking or side-to-side movement of photoconductor belt 12 during travel. The left and right margins 68, 70 of imaging region 66 are commonly fixed relative to the left and right edges 62, 64, respectively, of photoconductor belt 12. In contrast, the scan lines and image scan segments of scanners 24, 26, 28, 30 generally are fixed relative to a start-of-scan coordinate. The side-to-side movement of photoconductor belt 12 can cause movement of imaging region 66 relative to the start-of-scan coordinate. As a result, misregistration can occur between different scan lines and between different latent images. This misregistration can significantly degrade image quality. In particular, the misregistration can produce visible artifacts in the ultimate multi-color image upon transfer of the misregistered color separation images to output substrate 60.

Combination erase and belt position detection system 20 has erase station 21 and belt position detection system 22. Belt position detection system 22 operates to detect "belt walking" or the lateral or side-to-side movement of the photoconductor belt 12 relative to its desired transport path. Erase station 21 extends across photoconductor belt 12, and in particular, across imaging region 66. Erase station 21 includes a light source for controlled (and preferably uniform) illumination of photoconductor belt 12, such that any charge remaining on the surface of the photoconductor belt 12 from a previous imaging operation is uniformly discharged to ground. Belt position detection system 22 further includes photodetector 75. Erase station 21 also extends at least partially across photodetector 75, such that the erase station 21 light source is at least partially in optical alignment with photodetector 75. As such, the erase station 21 light source is used as both an erase bar and also as a light source for use with photodetector 75 in the belt position detection system 22. In one exemplary embodiment shown, the belt position detection system 22 is a belt edge detection system. As such, both erase station 21 and photodetector 75 extend beyond left edge 62 of photoconductor belt 12. In response to the belt position detected by photodetector 75, belt steering system 44 operates to return the photoconductor belt 12 to its desired transport path. In another aspect, belt position detection system 22 is not a belt edge detection system, and does not rely on the position of the belt edge for determining belt position.

The belt steering system 44 may function as a roller adjustment mechanism. In one exemplary embodiment, the belt steering system 44 adjusts a position of roller 15 to move the photoconductor belt 12 in a lateral direction generally perpendicular to the direction of movement of the photoconductor belt 12 to reduce deviation of the photoconductor belt 12 from its desired transport path. The roller adjustment mechanism may be realized in a variety of different mechanisms. In one exemplary embodiment shown, the roller adjustment mechanism includes a solenoid 76 having an actuator 78 coupled to a pin 80 extending from the roller 15. The solenoid 76 is responsive to belt position detection system 22 for correcting the position of photoconductor belt 12 on roller 15. In particular, the roller 15 includes a center pin 82 having a left end 84 and a right end 86 extending outward in opposite directions from the roller 15. A generally U-shaped steering bracket 88 includes a first arm 90 and a second arm 92. The first arm 90 is rotatably coupled to left end 84 and the second arm 92 is rotatably coupled to right end 86. The U-shaped bracket 88 includes an intermediate member 94 which is fixedly attached at its center to the center pin 80. Upon energization of solenoid 76, the actuator 78 is operated to move or rotate the center pin 80 in a clockwise direction 95 or a counter-clockwise direction 97 (indicated by directional arrows 95, 97). This results in movement of the photoconductor belt 12 in a right or first direction 96 or a left or second direction 98. The control and energization of solenoid 76 is responsive to belt position detection system 22 and an associated belt steering controller. Belt position detection system 22, the belt steering controller, and belt steering system 44 are described in more detail later in the specification.

Erase station 21 extends across imaging region 66 over left margin 68 and right margin 70 to provide a uniform light exposure to imaging region 66 for erase of (i.e., removal of charge) belt 12. Erase station 21 further extends over belt edge 62 in optical alignment with photodetector 75 to provide illumination for belt position detection system 22. Combination erase and belt position detection system 20, including erase station 21 is described in more detail later in the specification.

Figure 2A:
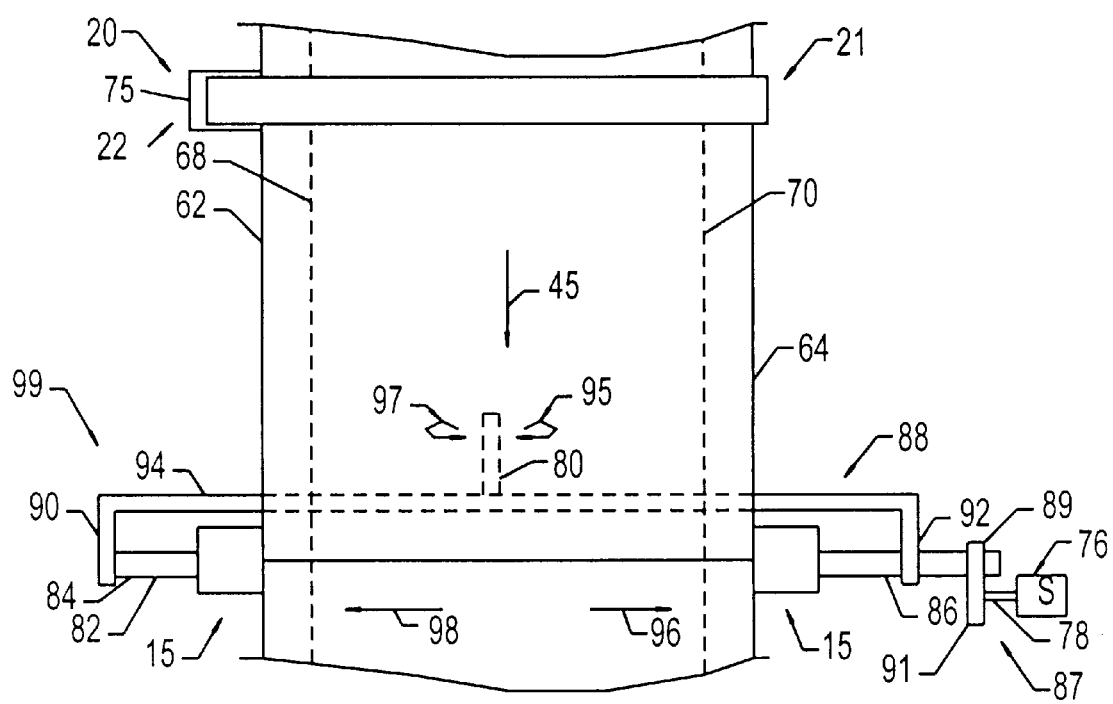
FIG. 2A is a partial plan view illustrating another exemplary embodiment of a combination belt erase and belt registration system in accordance with the present invention.

In FIG. 2A, one preferred embodiment of belt steering system is shown at 99. The belt steering system 99 is similar to the belt steering system 44 shown in FIG. 2. In the exemplary embodiment shown, the center pin 82 extends beyond second arm 92 of the generally U-shaped steering bracket 88. Solenoid 76 is operably coupled to the center pin 82 at right end 86. In particular, solenoid actuator 78 is coupled to the right end 86 through an intermediate linkage 87. The intermediate linkage 87 includes a first end 89 and a second end 91. The first end 89 is rotatably coupled to the center pin right end 86. The second end 91 is fixedly secured to the solenoid actuator 78. Further, center pin 80 is fixedly secured to the generally U-shaped steering bracket 88. In operation, solenoid 76 is responsive to belt position detection system 22 and an associated belt steering controller for movement of the intermediate linkage up or down through actuator 78. In turn, the intermediate linkage 87 moves the roller 15 end 86 up or down. As the end 86 is moved up or down, the roller 15 rotates about a longitudinal axis defined by the center pin 80. In particular, upon energization of solenoid 76, the right end 86 is moved up, causing rotation of the roller 15 about center pin 80 in the direction 95. Similarly, upon movement of right end 86 downward, the roller 15 is rotated about center pin 80 in a direction 97. This results in corresponding movement of the photoconductor belt 12 in the left direction 98 or the right direction 96. It is recognized other belt steering systems may be used with the light belt position detection system in accordance with the present invention.

In the example of FIG. 1, imaging system 10 is a four-color imaging system. However, the registration system having a combination erase bar and belt position detection system of the present invention can be readily applied to provide registration of any number of one or more latent images on a photoconductor belt. In addition, although imaging system 10 is shown as a multi-color/single-pass system in FIG. 1, the registration system of the present invention can be readily applied to multi-pass electrophotographic imaging systems requiring common registration of color separation images on a photoconductor belt. In a multi-pass imaging system, walking motion of the photoconductor belt may be somewhat periodic. Thus, misregistration between consecutive latent images may be more predictable than in a single-pass system. Nevertheless, a registration system, in accordance with the present invention, is useful in a multi-pass system to improve image quality.

The unique combination erase and belt position detection system 20 in accordance with the present invention utilizes erase station 21 as a uniform light source for removing any remaining charge from the surface of photoconductor belt 12, and also uses erase station 21 as a light source for the belt position detection system 22. In the exemplary embodiments shown in FIG. 2 and FIG. 2A, belt position detection system 22 is a belt edge detection system, and as such, erase station 21 extends across imaging region 66 and belt edge 62 in optical alignment with photodetector 75. Optionally, a variety of erase stations may be adapted to be used in a combination erase and belt position detection system in accordance with the present invention, wherein the light source emission wavelength matches the spectral response of the photoconductor belt and the photodetector is also responsive to the light source. For example, such erase station 21 light sources may include a linear array of light emitting diodes, a broad band linear incandescent light source, a linear fluorescent tube light source, or light guide. Other suitable erase stations may become known to those skilled in the art after reading the disclosure of the present invention.

Figure 3:
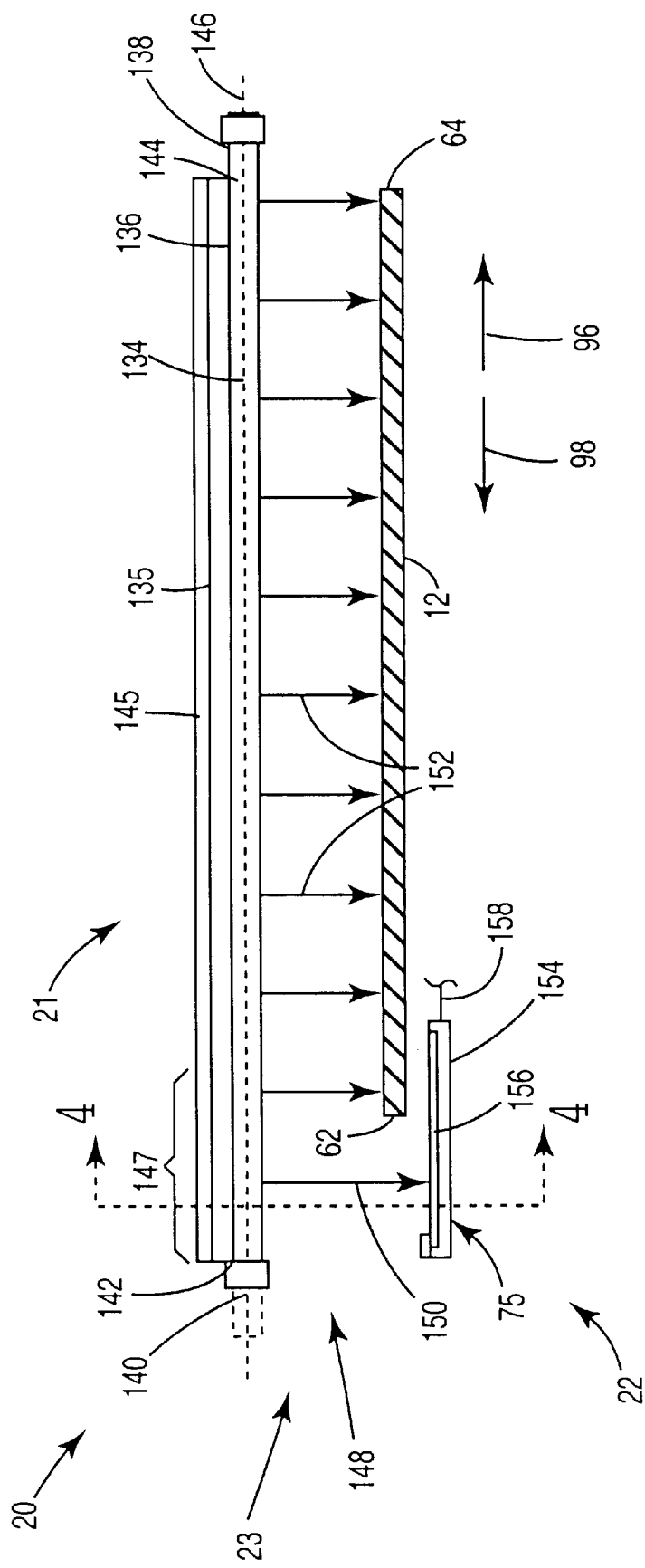
FIG. 3 is a diagram illustrating one exemplary embodiment of a combination belt erase and belt registration system, in accordance with the present invention.

FIG. 3 is a schematic diagram illustrating one exemplary embodiment of a combination erase and belt position detection system 20 in accordance with the present invention. Combination erase and belt position detection system 20 includes erase station 21 and belt position detection system 22. In one preferred embodiment, erase station 21 includes a unique optical fiber light assembly which operates as an illumination device to provide a controlled, uniform light source across the photoconductor belt for uniform reduction of charge on and in the photoconductor belt and a light source for belt position detection system 22. The erase station in accordance with the present invention may be used in a variety of electrophotographic imaging systems, including photocopiers. Further, the erase station including the unique optical fiber light assembly is not limited to use in electrophotography, but may be used in other image reproduction systems.

Erase station 21 is a light distribution system which includes an optical fiber 134 and mechanism or means for uniform light extraction 135. In one preferred embodiment, the optical fiber is a large diameter (e.g., >1.0 millimeters) optical fiber for transporting light. Such large core optical fibers are sometimes known as "light fibers". Light injected into an end of the optical fiber propagates along the fiber core according to the principles of total internal reflection. The mechanism for uniform light extraction allows for selective extraction of light from the optical fiber, wherein light can be extracted with a predetermined, desired energy distribution pattern. In one preferred embodiment, light injected into an end of the optical fiber propagates along the fiber core generally along its longitudinal axis according to the principles of total internal reflection, and the mechanism for uniform light extraction provides for light to be extracted radially in a manner that is controlled, and preferably uniform, both radially and longitudinally. The mechanism for uniform light extraction is described in detail further in the specification.

Erase station 21 includes a first light source 138, and optionally, may include a second light source 140. Erase station 21 includes a first end 142 and a second end 144. Light source 138 is optically coupled to optical fiber 134 at one end, and as shown, is optically coupled to end 144. Second light source 140 may optionally be optically coupled to optical fiber 134 at end 142.

The ability to use a variety of light sources as input to optical fiber 134 is an advantage of the present invention. A point light source or other light source may be used. For example, an LED may be used as a point light source. If desired, as a point light source one LED may be positioned at light source 138, two LEDs positioned at 138 and 140, or one LED positioned at 140 may be used. An example of a suitable light emitting diode for use as a point light source for the erase station in accordance with the present invention is 720 nanometer, NR405AF, commercially available from Stanley Electric Co., Ltd., Japan. Other light sources may include fluorescent light, incandescent sources or laser diodes.

A reflector may be positioned at end 142 to reflect the light from light source 138 back into the fiber in a direction towards light source 138. End 142 and end 144 of optical fiber 134 are preferably optically smooth to reduce undesirable scattering of light. End 142 preferably comprises a reflector to reflect light back into the fiber towards light source 138. Alternatively, a reflector (e.g., a specular or non-specular reflector) may be positioned at end 144 to reflect the light from end 144 back into the fiber in a direction towards light source 140. For example, the reflector can be separate from the optical fiber and may be coupled to the end of the fiber (e.g., a vapor coated reflective metal on the end of the fiber). End 144 is preferably polished to reflect the light back into the fiber towards light source 140. The term optically smooth, as used herein, refers to light that is reflected from it remains substantially unscattered, wherein for this purpose substantially unscattered means less than 20 percent and preferably less than 10 percent scattered.

In one exemplary embodiment, if an LED is used as a point light source, LED failure is easy to detect and easy to replace in the event of a failure such as a burn out. In one aspect, the current flowing through the LED is monitored electrically, or the surface voltage of the photoconductor belt is monitored with an electrostatic volt meter. In another approach, the light traveling within optical fiber 134 may be monitored at either left end 142 or right end 144 through a viewing port. Also, the light being extracted along the length of optical fiber 134 between left end 142 and right end 144 may be monitored. In addition, an appropriately placed beam splitter which directs the light away from optical fiber 134 may be coupled to a photodetector through a viewing port. Other suitable failure detection mechanisms may become apparent to those skilled in the art after reading the disclosure in accordance with the present invention.

Light source 138 or light source 140 may also be an incandescent source. Heat generated by the incandescent source can be directed away or isolated from critical components of imaging system 10. The light produced by the incandescent source can be filtered through the use of a small optical filter positioned between the light source and the fiber, either at end 142, end 144, or both. The filtering can be accomplished by doping the optical cement used to mount the incandescent source at end 142 or end 144, by using an appropriately absorbing chromophore. The optical filtering may also be accomplished by introducing the absorbing chromophore into the core of optical fiber 134.

Light source 138 or light source 140 may also be a fluorescent light source. The fluorescent light source may also be filtered similar to the filtering of the incandescent source discussed above.

In one embodiment, light source 140 includes an LED that is air coupled to left end 142, and light source 138 includes an LED air coupled to the right end 144 in communication with optical fiber 134, and is held in place by a housing 145 (shown in cut-away to expose fiber 134 and mechanism 135). In the exemplary embodiment shown, housing 145 is a plastic channel tube which protects and holds optical fiber 134 and fixedly holds the LED light sources 138, 140 in position. It is recognized that other means may be employed which hold optical fiber 134 in a rigid position and provides for placement of light source 138 or light source 140 at end 144 or end 142, respectively, or operably coupling a reflector to the optical fiber, such as the use of index matching fluids or gels.

In the exemplary embodiment shown, the mechanism for uniform light extraction 135 is affixed at an interface 136 with optical fiber 134. Light extraction mechanism 135 extracts the light radially out of optical fiber 134, which is controllable based on the design of light extraction mechanism 135. In one aspect, light extraction mechanism 135 includes evenly or uniformly spaced extraction elements. In another aspect, light extraction mechanism 135 includes nonuniform spaced extraction elements to provide uniform distribution of light along optical fiber 134 to provide a uniform or desired light distribution pattern. In one preferred embodiment, non-uniform extraction elements are used to extract light radially from optical fiber 134, to provide a uniform source of illumination normal to longitudinal axis 146 of fiber 134 where the illumination is directed towards photoconductor belt 12. Exemplary embodiments of the surface geometry to provide controlled uniform or desired light distribution patterns are described in detail later in this application.

Photoconductor belt 12 is aligned in a plane, which is shown as a generally horizontal plane, and erase station 21 extends from edge 62 to edge 64, and is positioned above a surface of photoconductor belt 12. Thus, optical fiber 134 lies in a plane approximately parallel to the plane of the surface of photoconductor belt 12. This allows optical fiber 134 of erase station 21 to provide illumination to the surface of photoconductor belt 12 to perform the erase function. As known to those skilled in the art, when photoconductor belt 12 is exposed to light at a correct wavelength, the belt becomes partially conductive, thus, allowing charge present to uniformly discharge to ground. In one preferred embodiment, this discharge is achieved through grounding brush 19 as shown in FIG. 1.

Belt position detection system 22 employs both erase station 21 and photodetector 75. Left region 147 of erase station 21 is disposed adjacent left edge 62 of photoconductor belt 12, and is in optical alignment with photodetector 75. In the exemplary embodiment shown, belt position detection system 22 is a belt edge detection system. Left region 147 of erase station 21 identifies the portion of optical fiber 134 which is employed as a light source to perform the belt position detection function. Photodetector 75 being disposed adjacent left edge 62 of photoconductor belt 12 is on a side of photoconductor belt 12 opposite erase station 21. Erase station 21 includes light beam 148 having first portion 150 and second portion 152. Portion 150 is incident upon photodetector 75, and portion 152 of light beam 148 is incident upon photoconductor belt 12. Portion 152 of light beam 148 being incident upon imaging region 66 of photoconductor belt 12 performs the erase function. Portion 150 of light beam 148 incident upon photodetector 75, and portion 152 of light beam 148 incident upon photoconductor belt 12, vary with the degree of side-to-side movement of left edge 62. Thus, the left region 147 of erase station 21 extending from belt edge 62 should be large enough to overlap left edge 62 to at least some degree for the entire range of side-to-side movement of photoconductor belt 12.

Photodetector 75 may comprise a housing 154 having an active region 156 located thereon. The active region 156 overlaps left edge 62 of photoconductor belt 12. Photodetector 75 is sensitive to wavelengths of light beam 148 (emitted by optical fiber 134). The non-overlapping portion of active region 156 occupies the belt edge detection region adjacent left edge 62. The degree of overlap varies with the degree of side-to-side movement of left edge 62. Thus, the width of active region 156 should be large enough to overlap left edge 62 to at least some degree for the entire range of side-to-side movement of photoconductor belt 12.

Photodetector 75 generates a belt edge detection signal when light beam 150 from erase station 21 is detected within active region 156. The photodetector 75 provides a belt edge detection signal 158 which is representative of the light beam first portion 150 which is detected by active region 156. The belt edge detection signal generated by photodetector 75 is representative of the position of left edge 62 of photoconductor belt 12, and specifically, is representative of the amount of deviation of photoconductor belt 12 from its continuous transport path. Movement of photoconductor belt 12 in the left direction 98 results in less of portion 150 of light beam 148 being incident upon photodetector active region 156, and correspondingly results in a weaker and lower amplitude belt edge position detection signal 158. Similarly, movement of photoconductor belt 12 in a right direction 96 results in a correspondingly greater amplitude of belt edge position detection signal 158.

As photoconductor belt 12 deviates from a continuous transport path, the belt walking of photoconductor belt 12 during travel must be corrected for precise belt registration and registration of the latent images on photoconductor belt 12. As such, belt position detection system 22 detects lateral movement of photoconductor belt 12 relative to the continuous transport path, and provides an output signal to belt steering system 44 representative of the detected belt position.

Figure 4:
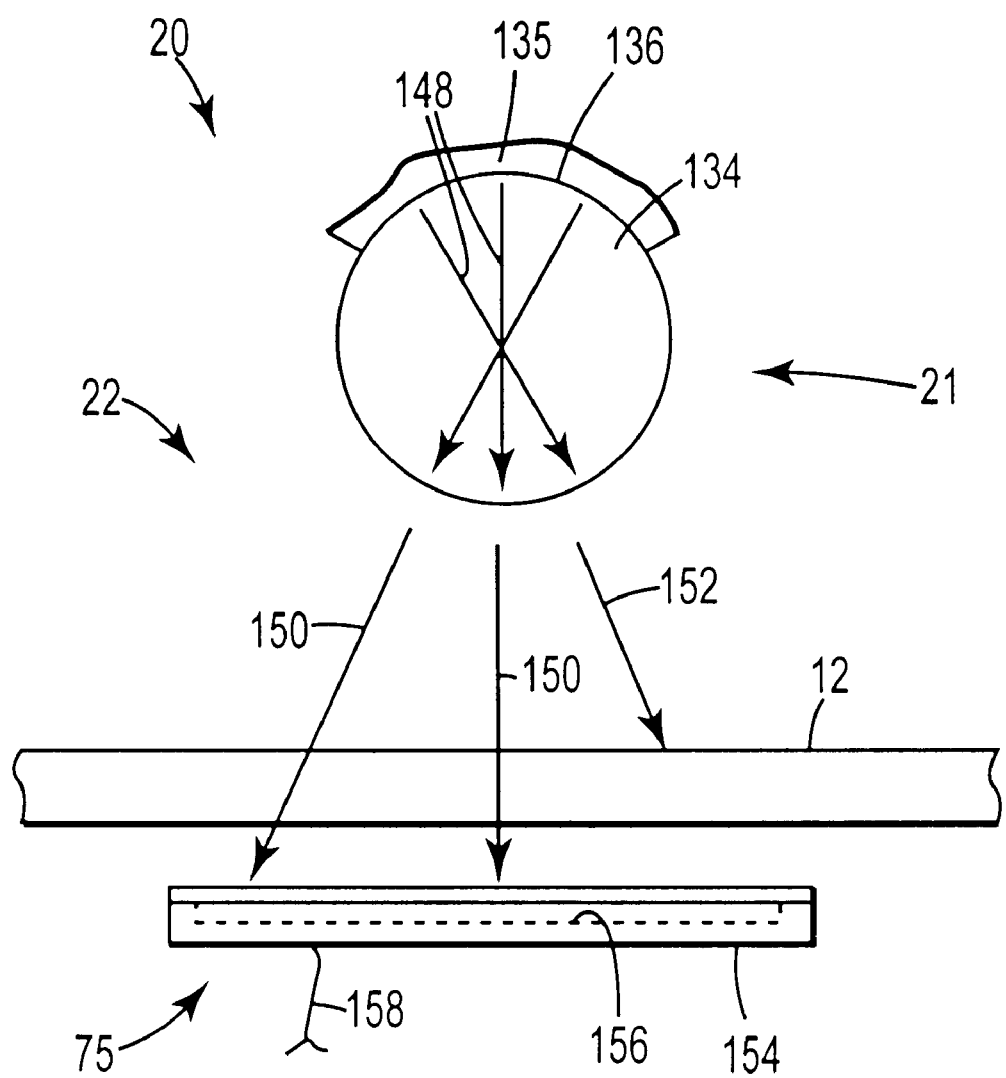
FIG. 4 is a partial cross-sectional view taken along line 4—4 of FIG. 3.

FIG. 4 shows a partial cross-sectional view taken along line 4—4 of FIG. 3, through left region 147 of optical fiber 134. FIG. 4 illustrates combination erase and belt position detection system 20, including erase station 21 and belt position detection system 22, and photoconductor belt 12 including left edge 62. Erase station 21 has optical fiber 134 and light extraction mechanism 135. Light beams 148 are shown as downwardly directed (extracted radially from optical fiber 134 and substantially normal to photoconductor belt 12) within optical fiber 134 towards the surface of photoconductor belt 12. Light beams 148 originate from light source 138 (and/or light source 140), propagate along the optical fiber 134 according to the principles of total internal reflection, and are downwardly directed and radially extracted towards the surface of photoconductor belt 12 by light extraction mechanism 135. Light extraction mechanism 135 delivers the light from light sources 138 or 140 out of optical fiber 134, preferably in a uniform, fixed amount per unit length of optical fiber 134. The illumination is downwardly directed within a narrow angular range in a direction perpendicular to the longitudinal axis of optical fiber 134. This illumination is illustrated as portion 150 and 152 of light beam 148. Portion 150 of light beam 148 is incident upon active region 156 of photodetector 75, and portion 152 of light beam 148 is incident upon photoconductor belt 12. Portion 152 of light beam 148 which are incident upon photoconductor belt 12 varies with the degree of side-to-side movement of left edge 62 (see also, FIG. 3).

In another embodiment, erase station 21 employs a pulsed light source. The pulsed light source provides for photoconductor belt erasing and as the light source for belt position detection system 22. Preferably, the light source is pulsed at a frequency different than the available AC line frequency (e.g., in the U.S. 60 Hertz), and more preferably, at a high frequency relative to the available line frequency 60 Hertz. Further, to ensure uniform reduction of charge on the photoconductor, it may be desirable for the light source to pulse at a high frequency relative to the speed of the photoconductor belt. In one exemplary embodiment, first light source 138 (and second light source 140) comprises an LED which is pulsed at a rate of 20 kHz. During operation of the electrophotographic imaging system, photoconductor belt 12 is moved at a speed of approximately 3 inches per second.

By using a pulsed light source for erase station 21, the belt position detection system 22 is not affected by ambient light conditions. In particular, the pulsed light belt position detection system can be used in light conditions ranging from total darkness to very bright ambient light conditions. The pulsed light belt position detection system in accordance with the present invention is less susceptible to external noise sources. As such, maintenance may be performed on the belt registration system in a bright light environment without affecting the pulsed light belt position detection system.

One suitable belt position detection system which utilizes a pulsed light source is disclosed in U.S. patent application Ser. No. 08/885,472 to Brenner et al., filed Jun. 30, 1997, entitled "BELT POSITION DETECTION SYSTEM FOR BELT REGISTRATION IN AN ELECTROPHOTOGRAPHIC IMAGING SYSTEM", the entire contents of which are incorporated herein by reference.

In one exemplary embodiment, belt edge position detection signal 158 ranges from 0 to 8 volts, and has a set point at approximately 4 volts. The set point corresponds to the desired position of photoconductor belt 12 relative to the right direction 96 or the left direction 98. Thus, movement of photoconductor belt 12 in the right direction 96 results in photodetector active region 156 being saturated, and belt edge position detection signal being 8 volts. The saturation voltage corresponds to the belt edge moving off the edge of the roller.

Figure 5:
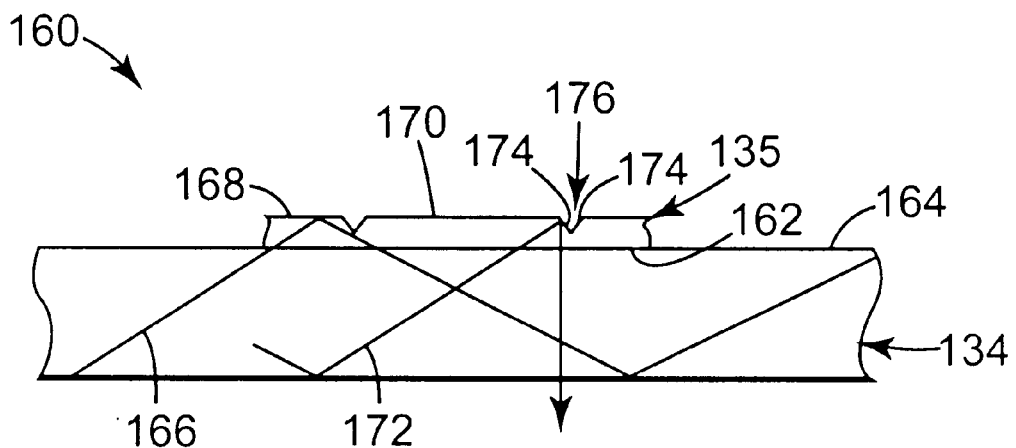
FIG. 5 is a cross-sectional view illustrating one exemplary embodiment of an illumination device for use in an erase bar in accordance with the present invention.
Figure 6:
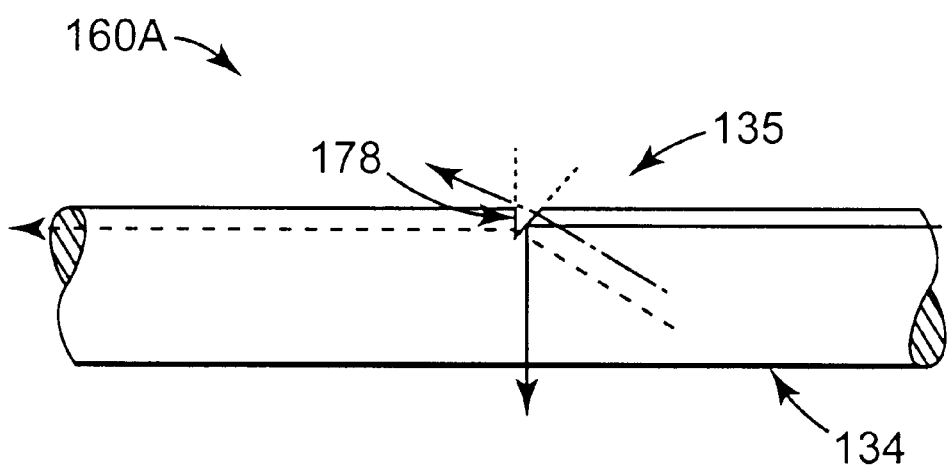
FIG. 6 is a cross-sectional view illustrating another exemplary embodiment of an illumination device for use in an erase bar in accordance with the present invention.

FIGS. 5 and 6 illustrate exemplary embodiments of a unique optical fiber light assembly 160 used in erase station 21, having a light extraction mechanism 135 for uniform or desired, controlled extraction of light from optical fiber 134.

In reference also to FIG. 5, one suitable mechanism for uniform light extraction is disclosed in U.S. Pat. No. 5,631, 994 to Appeldorn et al., issued May 20, 1997, and entitled "STRUCTURED SURFACE LIGHT EXTRACTION OVERLAY AND ILLUMINATION SYSTEM", the entire contents of which are incorporated herein by reference. In the above light distribution system, as light propagates through the optical fiber core according to the principles of a total internal reflection, the mechanism for uniform light extraction includes a light extraction mechanism or overlay which operates to allow a portion of the light which propagates along the optical fiber to be controllably redirected into the fiber at an angle which is less than the critical angle necessary for continued propagation in the optical fiber and, is transmitted radially from the surface of the optical fiber.

The light extraction overlay includes a substantially optically transparent substrate which has a base surface and a structured surface opposite the base surface. The structured surface includes one or more optical elements or extraction elements (e.g., a notch) which have optically smooth surface disposed at an angle relative to the base surface. The optical elements may be separated by substantially planar portions of the structured surface.

In use, the base surface is optically coupled with a portion of a surface of the optical fiber such that light may be transmitted from the optical fiber into the substrate. Light rays which strike a planar portion of the structured surface are reflected back into the fiber at an angle which is greater than the critical angle necessary for continued propagation in the optical fiber and, accordingly, continue to propagate along the optical fiber. Light rays which strike an optical element are reflected into the fiber at an angle less than the critical angle necessary for continued propagation in the optical fiber and, accordingly, are transmitted from the surface of the optical fiber.

The basic principles of operation of the light extraction mechanism 135 (shown as an overlay) may be illustrated with reference to FIG. 5. FIG. 5 represents a schematic cross-sectional view of a light extraction mechanism in operative contact with optical fiber 134. As illustrated, base surface 162 of overlay 135 is optically coupled with the surface 164 of optical fiber 134. In use, light ray 166 is transmitted across the interface between optical fiber 134 and base surface 162 of light extraction mechanism 135 and strikes a substantially planar portion 168 of structured surface 170, where it is reflected back into optical fiber 134 at an angle greater than the critical angle of optical fiber 134 and accordingly, continues to propagate along optical fiber 134.

By contrast, light ray 172 is transmitted across the interface between optical fiber 134 and base surface 162 of light extraction mechanism 135 and strikes an optically smooth surface 174 of optical element 176 which is disposed at an angle relative to the plane of the base surface 162. Accordingly, light ray 172 is reflected from optically smooth surface 174 into optical fiber 134 and strikes a surface of optical fiber 134 at an angle which is less than the critical angle necessary for continued propagation along optical fiber 134, thereby allowing light ray 172 to be transmitted from the surface of optical fiber 134. Optically smooth surface 174 maybe coated with a specularly reflective material, such as, for example, aluminum or silver.

One of ordinary skill in the optical arts will appreciate that the characteristics (e.g., line, width, thickness, shape and size of optical elements, etc.) of overlay light extraction mechanism 135 vary widely depending upon the requirements of the erase bar application. For example, the shape, the cross-sectional area and the angle of inclination (relative to the base surface) of each optically smooth surface will influence the amount of light extracted from the optical fiber. Consequently, the amount and direction of light reflected from the optical fiber can be controlled by selecting the appropriate geometry for optical elements 176, as well as the pattern and spacing of the optical elements 176. Additionally, the optical properties of overlay light extraction mechanism 135 may be combined with the optical properties of an optical fiber to yield an optical system with desired properties. For example, a light extraction mechanism may take advantage of the optical power provided by the curved surface of an optical fiber to focus extracted light into a desired energy distribution. In the embodiment depicted in FIG. 5, optically smooth surface 174 of optical element 176 is inclined at an angle of approximately 45° relative to base surface 162, although it will be appreciated that angles from 10°–80°, preferably from 20°–70°, and more preferably from 30°–60° are also useful depending on the desired amount and direction of travel of light exiting the optical fiber. However, any useful angle between 0° and 90° may be used. Optionally, the overlay light extraction mechanism 135 may be in the form of a "light extraction tape" coupled to the optical fiber 134 by adhesive.

In FIG. 6, another exemplary embodiment of an optical fiber assembly 160 (indicated as 160A) for use as an erase bar is illustrated. In this embodiment, the means for controlled light extraction 135 is integral with the optical fiber 134, which includes one or more optical elements 178 (e.g., a notch) in a portion of the surface of the optical fiber 134 along its length. The optical elements 178 in the optical fiber surface operates similar to the overlay light extraction mechanism 135 described above. As light propagates through the optical fiber along its length according to the principles of total internal reflection, the optical elements in the surface of the optical fiber operate to redirect the light internally, allowing for the redirected light to radially exit the optical fiber to perform an erase bar function. The pattern of the optical elements 178 in the optical fiber surface can be varied to control the light distribution pattern of the light radially exiting the optical fiber.

Suitable light distribution systems for use in an erase bar according to the present invention having optical elements in at least a portion of the surfaces of the optical fiber along its length for redirecting light radially from the optical fiber in a controlled manner are disclosed in U.S. Pat. No. 5,659,643 (issued Aug. 19, 1997, to Appeldorn et al.) entitled "NOTCHED FIBER ARRAY ILLUMINATION DEVICE". The entire content of the above-referenced patent application is incorporated herein by reference. Another suitable light distribution system wherein the means for controlled light extraction is integral with the optical fiber 134 is disclosed in U.S. Pat. No. 5,432,876 (issued Jul. 11, 1995, to Appeldorn et al.) entitled "ILLUMINATION DEVICES AND OPTICAL FIBRES FOR USE THEREIN". The entire content of U.S. Patent No. 5,432,876 is incorporated herein by reference.

It is understood that aside from the exemplary embodiments described herein, there are other means whereby light may be extracted optical fiber 134, and that this invention applies to any mechanism that controllably or uniformly radially extracts light along the longitudinal axis of optical fiber 134. Other exemplary embodiments may include means for uniform light extraction including the machining of a pattern onto one side of optical fiber 134. In another exemplary embodiment, the core material within optical fiber 134 may be doped with scattering centers, such as glass or polymeric microspheres, gas bubbles, or phase separated microdomains. In yet another approach, the core material within optical fiber 134 may be doped with a fluorescing material which emits at the appropriate wavelength and are excited by the appropriate source coupled to an end of optical fiber 134.

Figure 6A:
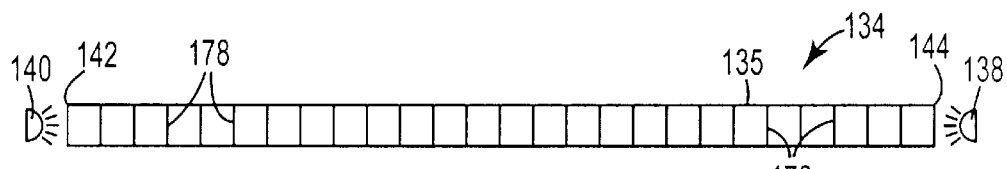
FIG. 6A is one exemplary embodiment of an optical fiber including a light extraction mechanism having a structured surface for controlling light extraction from the optical fiber in accordance with the present invention.
Figure 6B:
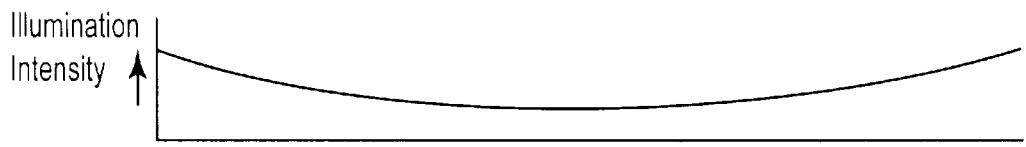
FIG. 6B is one exemplary embodiment of a graph illustrating illumination intensity across a photocondutor belt for the optical fiber of FIG. 6A.
Figure 6C:
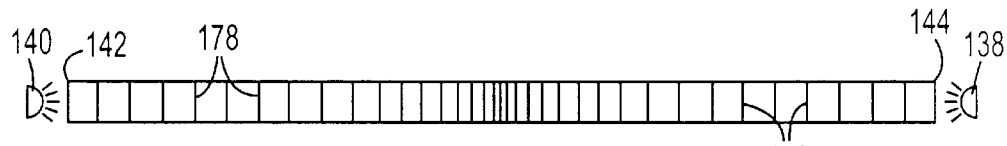
FIG. 6C is one exemplary embodiment of an optical fiber including a light extraction mechanism having a structured surface for controlling light extraction from the optical fiber in accordance with the present invention.
Figure 6D:
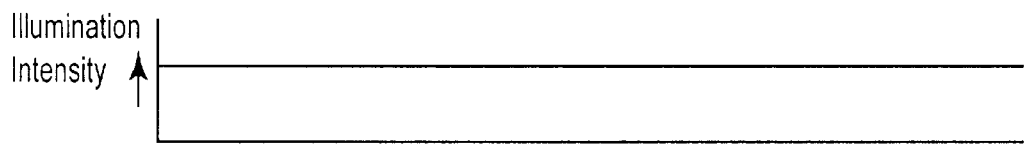
FIG. 6D is one exemplary embodiment of a graph illustrating illumination intensity across a photocondutor belt for the optical fiber of FIG. 6C.

FIGS. 6A–6F illustrate exemplary embodiments of controlling the light extraction from optical fiber 134 by changing the structured surface of light extraction mechanism 135 to obtain a desired illumination intensity across the photoconductor belt 12. In the exemplary embodiment shown, first light source 138 and second light source 140 are provided at opposite ends 142, 144, respectively, of optical fiber 134. In FIG. 6A, optical elements 178 in the structured surface of light extraction mechanism 135 are equally spaced across optical fiber 134. In reference to FIG. 6B, this may result in a non-uniform light distribution pattern across the photoconductor belt, wherein the illumination intensity is greater below ends 142, 144 and decreases towards the center of the photoconductor belt.

Figure 6E:
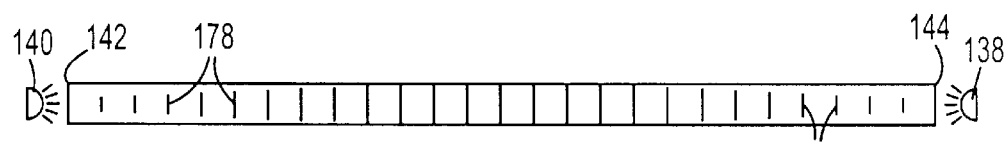
FIG. 6E is one exemplary embodiment of an optical fiber including a light extraction mechanism having a structured surface for controlling light extraction from the optical fiber in accordance with the present invention.
Figure 6F:
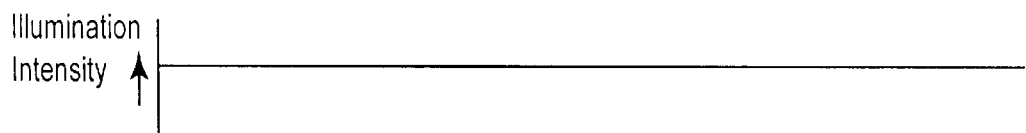
FIG. 6F is one exemplary embodiment of a graph illustrating illumination intensity across a photocondutor belt for the optical fiber of FIG. 6E.

Preferrably, in electrophotograpic applications the erase bar provides a controlled, uniform light source across the surface of the photoconductor belt. In reference to FIG. 6C optical elements 178 are spaced closer together near the center of the light extraction mechanism 135, resulting in a uniform light distribution pattern across the photoconductor belt represented by the graph of FIG. 6D. In FIG. 6E, another exemplary embodiment is shown wherein the length of optical elements 178 are varied to also produce a substantially uniform distribution of light across photoconductor belt 12. In particular, the length of optical elements 178 is increased near the center of the light extraction mechanism 135 to increase the propagation of light near the center of photoconductor belt 12, resulting in a uniform light distribution pattern represented by the graph of FIG. 6F.

Figure 7:
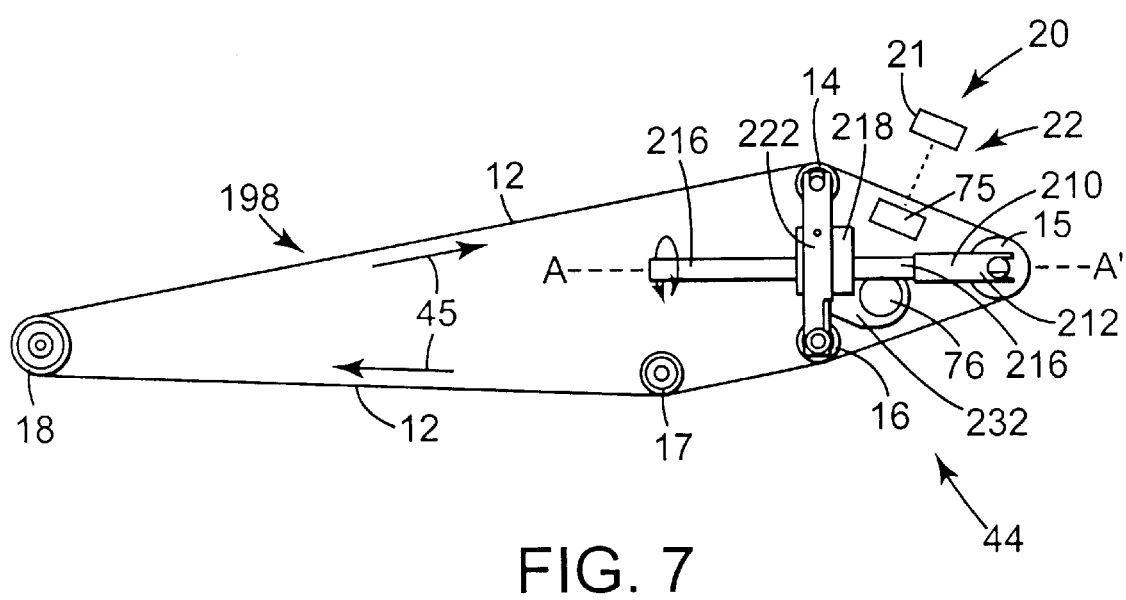
FIG. 7 is a side view of an exemplary photoconductor belt apparatus including a combination belt erase and belt registration system, in accordance with the present invention.
Figure 8:
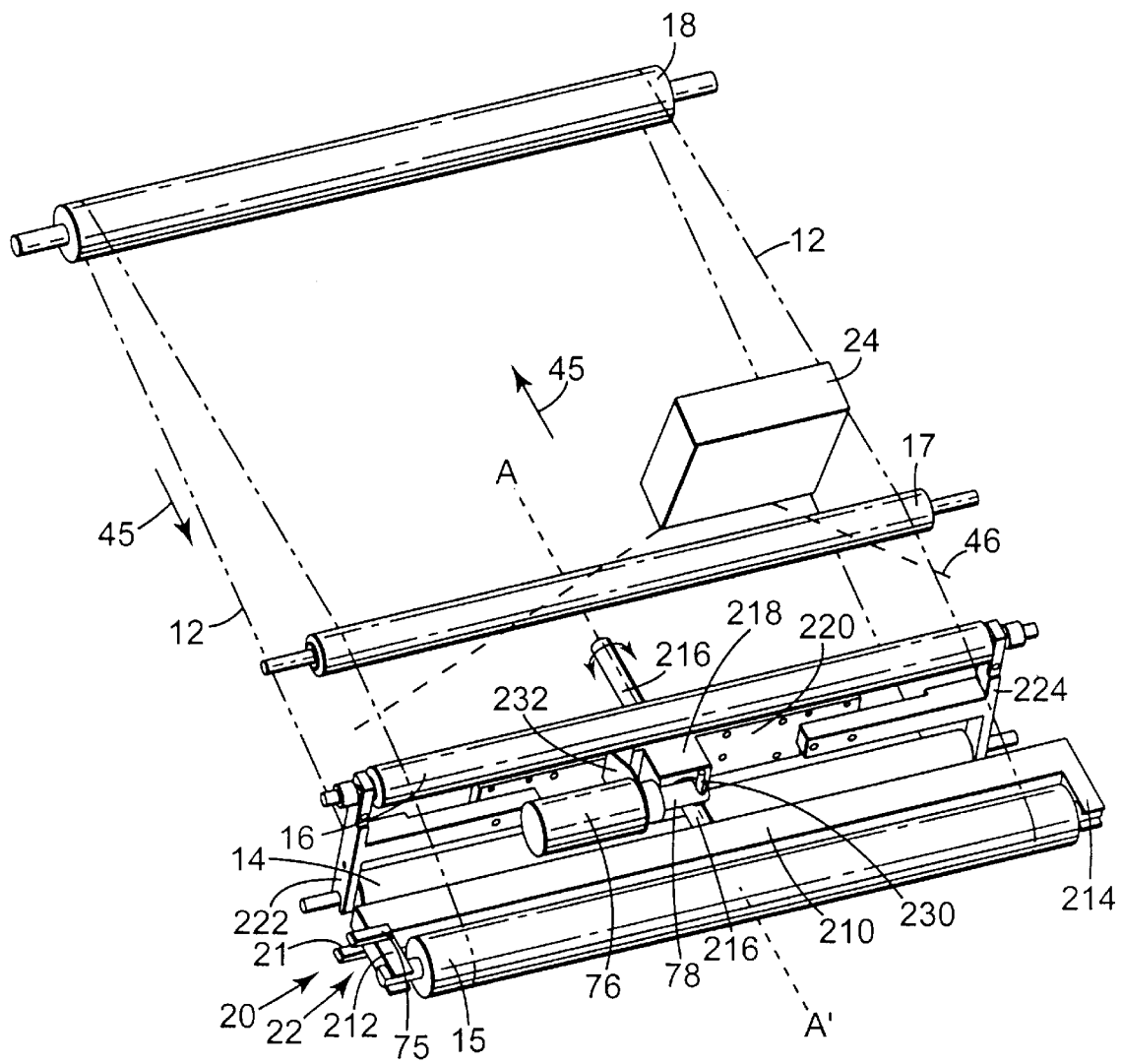
FIG. 8 is a bottom perspective view of the combination belt erase and belt registration system of FIG. 7.

FIGS. 7 and 8 illustrate an exemplary photoconductor belt apparatus 198 that makes use of a belt steering control system useful in a registration system having a combination erase and belt position detection system 20 in accordance with the present invention. For ease of illustration, FIG. 8 shows only one of the plurality of scanners 24, 26, 28, 30 ordinarily positioned to scan laser beams 46, 48, 50, 52 across photoconductor belt 12. FIGS. 7 and 8 show combination erase and belt position detection system 20 disposed about photoconductor belt 12. In the exemplary apparatus of FIGS. 7 and 8, photoconductor belt 12 is mounted about rollers 14, 15, 16, 17, 18. The shaft of one of rollers 14, 15, 16, 17, 18 (in the particular embodiment shown, roller 18) is coupled to a drive mechanism such as a motor (not shown) either directly or via any of a variety of drive transmissions. The drive mechanism drives the roller, which frictionally drives photoconductor belt 12 to move about rollers 14, 15, 16, 17, 18 in a continuous transport path in the direction indicated by arrow 45. As shown in FIGS. 7 and 8, roller 15 is supported on a pivotable carriage 210 that forms part of a belt steering mechanism, in accordance with the present invention.

Figure 9:
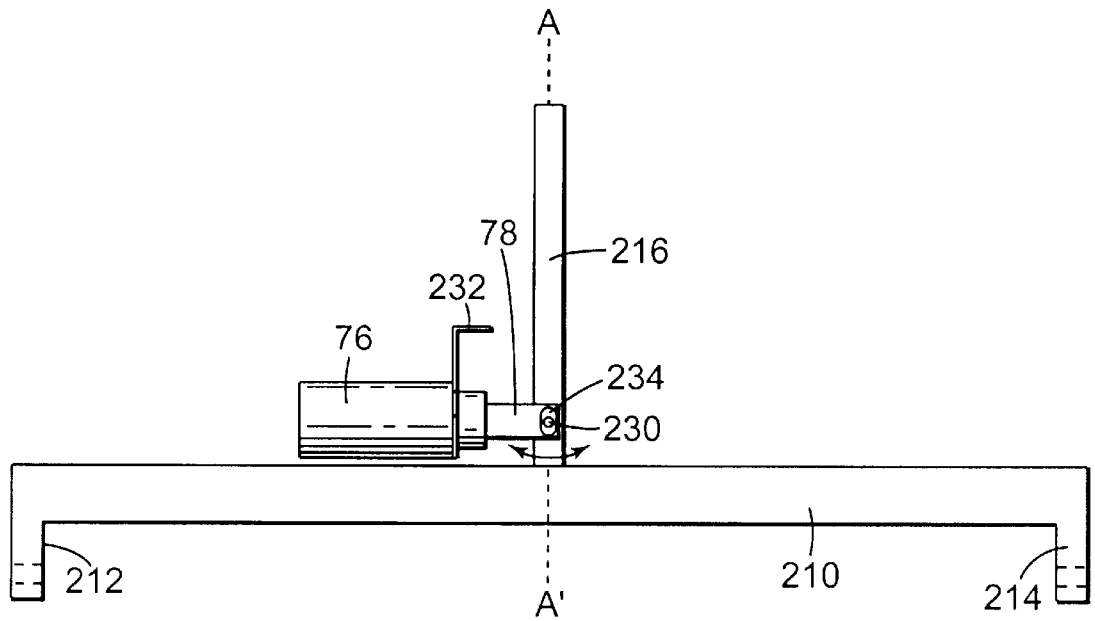
FIG. 9 is a front view of a belt steering mechanism useful in the belt steering control system of FIG. 8.
Figure 10:
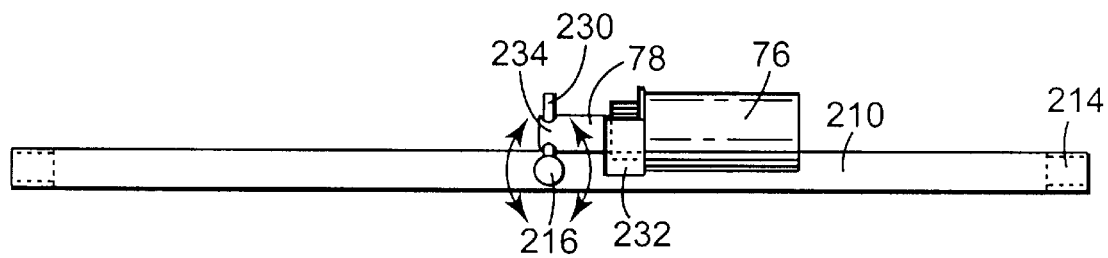
FIG. 10 is a top plan view of the belt steering mechanism of FIG. 9.

Referring also to FIGS. 9 and 10, carriage 210 is further illustrated. The pivotable carriage 210 includes a pair of carriage mounts 212, 214. Each of the carriage mounts 212, 214 retains one end of the shaft of roller 15. The carriage 210 is mounted in a fixed manner to a carriage pin 216. The carriage pin 216 mounts to a central portion of carriage 210. The carriage 210 moves photoconductor belt 12 in a direction perpendicular to the transport path by rotation about a steering axis A—A coincident with the longitudinal axis of carriage pin 216. To enable rotation, carriage pin 216 is mounted in a journal bearing (not shown) in a support block 218. The support block 218 includes a support plate 220. First and second block mounts 222, 224 are coupled to support plate 220. The first and second block mounts 222, 224 retain opposite ends of the shafts associated with rollers 14 and 16.

In this example, the belt steering mechanism functions as a roller adjustment mechanism that adjusts a position of roller 15 to move photoconductor belt 12. The roller adjustment mechanism may be realized by a variety of different mechanisms. As illustrated by the example of FIGS. 7, 8, 9, and 10, the roller adjustment mechanism may include solenoid 76 having an actuator 78 coupled to an actuator pin 230 extending outward from carriage pin 216. A number of different actuating mechanisms could be used such as, for example, a stepper motor. The solenoid 76 is mounted on a bracket 232 coupled to support block 218. The actuator pin 230 extends through an aperture 234 in actuator 78 of solenoid 76. The actuator extends perpendicular to carriage pin 216 and, consequently, steering axis A—A. The belt steering controller transmits a signal that selectively energizes and de-energizes solenoid 76 to move actuator 78 inward and outward relative to the solenoid 76. The actuator 78 thereby moves actuator pin 230 to rotate carriage pin 216 in the journal bearing in support block 210. The rotation of carriage pin 216 adjusts the position of roller 15 relative to the other rollers 14, 16, 17, and 18. The photoconductor belt 12 tends to move in a direction perpendicular to the continuous transport path in response to adjustment of the position of roller 15. In particular, photoconductor belt 12 tends to walk laterally along roller 15 in response to the variation in the attitude of the roller, reducing deviation of photoconductor 12 from its continuous transport path.

Figure 11:
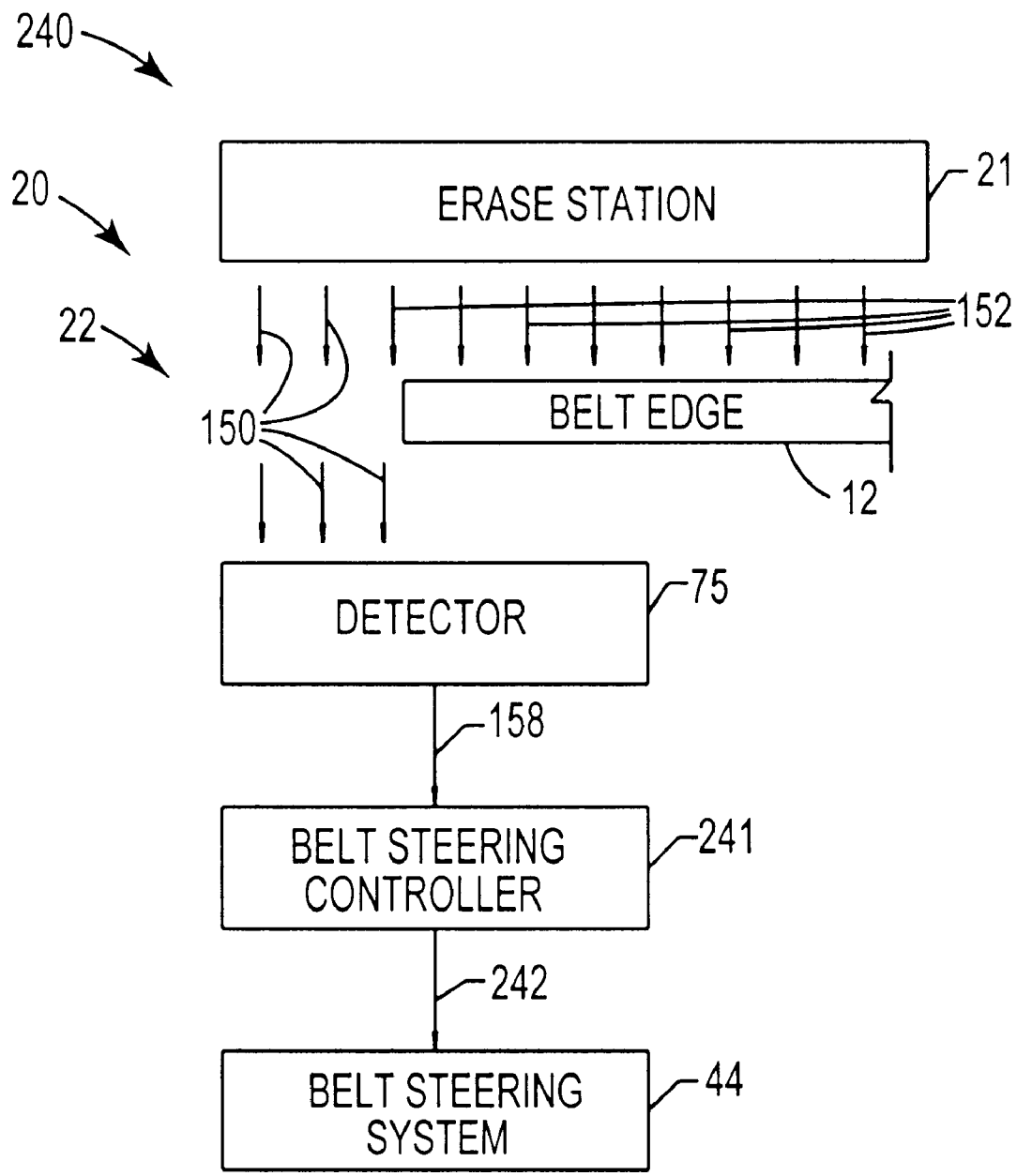
FIG. 11 is a functional block diagram illustrating one exemplary embodiment of a combination belt erase and belt registration system for use with an electrophotographic imaging system in accordance with the present invention.

FIG. 11 is a functional block diagram illustrating operation of combination erase and belt position detection system 20 and belt steering system 44 in accordance with the present invention and is generally shown at 240. As previously described herein, erase station 21 is in optical alignment with photodetector 75. Photodetector 75 is responsive to erase station 21 for providing belt edge detection signal 158, the amplitude of which is representative of the lateral position of the photoconductor belt 12 relative to a continuous transport path. The present invention further includes a belt steering controller 241 which is electrically coupled to the photodetector 75. Belt steering controller 241 is responsive to the belt edge detection signal 158 for providing a control signal, indicated at 242, to belt steering system 44 for activation/deactivation of the belt steering system 44 to reduce the deviation of the photoconductor belt 12 from the continuous transport path.

In one exemplary embodiment, the belt steering controller controls the belt steering mechanism based on the belt position detection signals generated by the belt position detection system 22, and more specifically, based on the belt position detection signal generated by photodetector 75, to reduce deviation of photoconductor belt 12 from the continuous transport path. In this manner, belt steering controller 241 reduces significant deviation that can lead to misregistration of the latent images formed by scanners 24, 26, 28, 30 on photoconductor belt 12. The belt steering controller 241 may be configured to energize solenoid 76 based on the belt edge detection signal for a period of time sufficient for photoconductor belt 12 to walk along roller 15 to the appropriate lateral position in the transport path. The period of time can be determined based on the position information provided by the belt position detection signal and knowledge of the rate of movement characteristics of photoconductor belt 12 along roller 15. The belt steering controller 241 also could be configured to energize solenoid 76 for period of time until the belt edge detection signal indicates that the position of the belt edge has returned to the proper position.

Alternatively, solenoid 76 may be configured to move actuator 78 between multiple positions in response to different levels of energization, or different control signals. In this case, based on the belt edge detection signal, belt steering controller 241 may be configured to apply to solenoid 76 a signal that drives actuator 78 to a particular position. The particular position can be selected to achieve a degree of rotation of carriage pin 216 sufficient for photoconductor belt 12 to walk to the appropriate lateral position. As another alternative, belt steering controller 241 can be configured to modulate both the energization time and position of solenoid 76 to achieve desired movement of photoconductor belt 12. Solenoid 76 and belt steering controller 241 may be configured to provide no more than a maximum degree of movement of photoconductor belt 12 in a given time to avoid sudden adjustments that could be visible in the final multi-color image.

Figure 12:
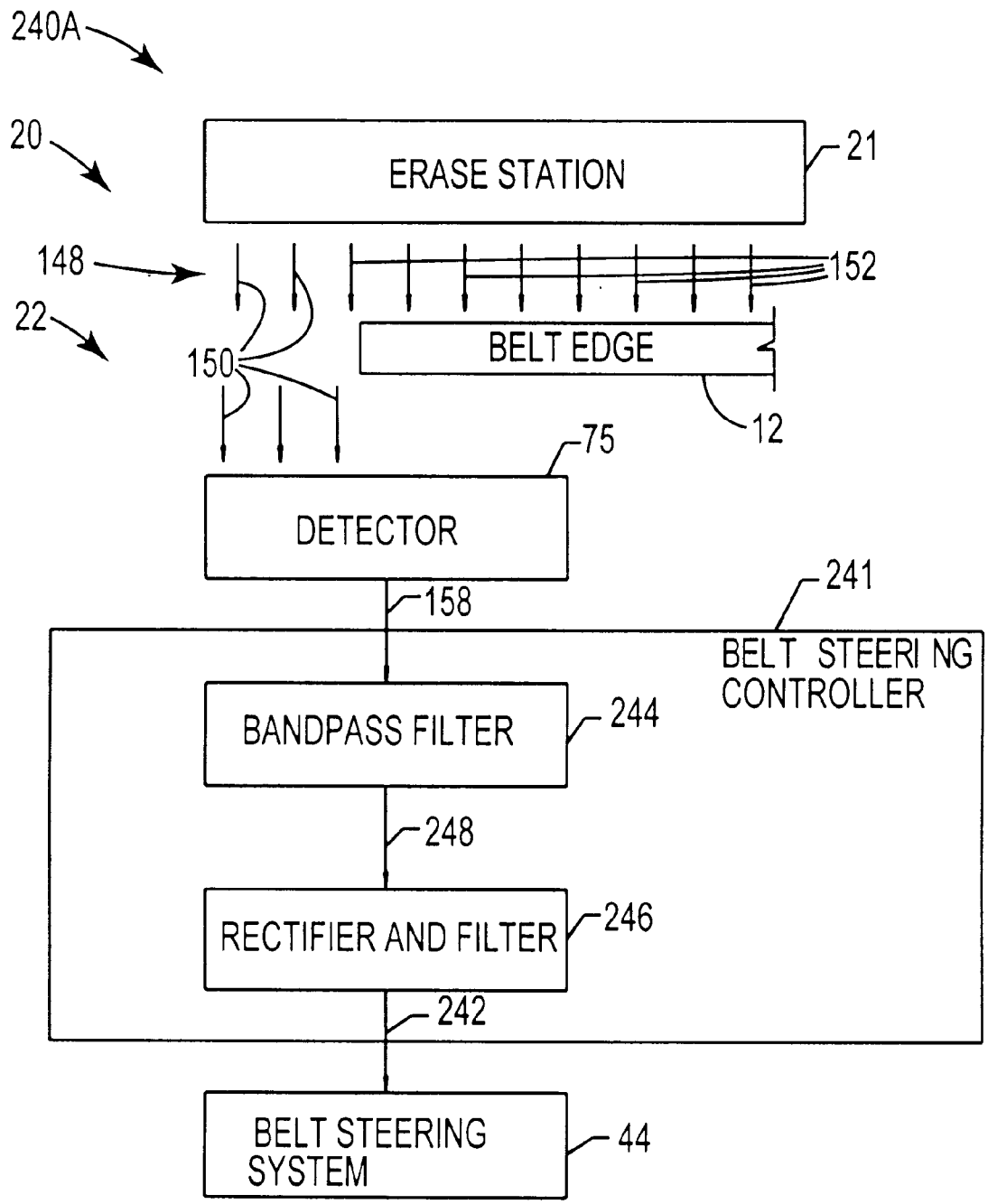
FIG. 12 is a functional block diagram illustrating another exemplary embodiment of a combination belt erase and belt registration system for use with an electrophotographic imaging system in accordance with the present invention.

In FIG. 12, a functional block diagram illustrating another exemplary embodiment of combination erase and belt position detection system 20 and belt steering system 44 for belt registration in an electrophotographic imaging system is generally shown at 240A. In this embodiment, erase station 21 employs a pulsed light source as previously described herein. The belt position detection system 22 can be termed an "asynchronous detection system". The photodetector 75 is a reversed biased photodiode which will allow only the light beam to be generated as belt edge detection signal 158 in the form of a square wave. The light beam 148, which may be pulsed, is received by the photodetector 75, with the resulting belt edge detection signal 248, in the form of a sine wave, being generated which is representative of the position of the photoconductor belt 12 (see also, FIGS. 3 and 4).

The belt edge detection signal 158 is output to belt steering controller 241. In one exemplary embodiment shown, the belt steering controller 241 includes a band pass filter 244 which is electrically coupled to a rectifier and filter 246, indicated by interface 248. The belt edge detection signal 158 is input to the band pass filter 244. It is recognized that an amplifier, such as an adjustable analog amplifier, may be coupled between the photodetector 75 and the band pass filter 244. The band pass filter 244 has a center frequency which is approximately equal to the frequency of the light source when pulsed. The band pass filter 244 functions to filter out undesired noise and frequencies, such as AC line or 60 cycle pick-up, and provides an output signal 248 in the form of a sine wave to rectifier and filter 246. At rectifier and filter 246, the sine wave is rectified and passed through an R-C circuit, being converted from an AC signal to a DC output signal, which is indicated as signal 242.

Accordingly, the signal 242 is a DC signal which is representative and proportional to the position of edge 62 of photoconductor belt 12, relative to the continuous path of photoconductor belt 12. As previously described herein, the signal 242 is output to the belt steering system 44 for controlled energization (activation/deactivation) of the belt steering system 44.

Figure 13:
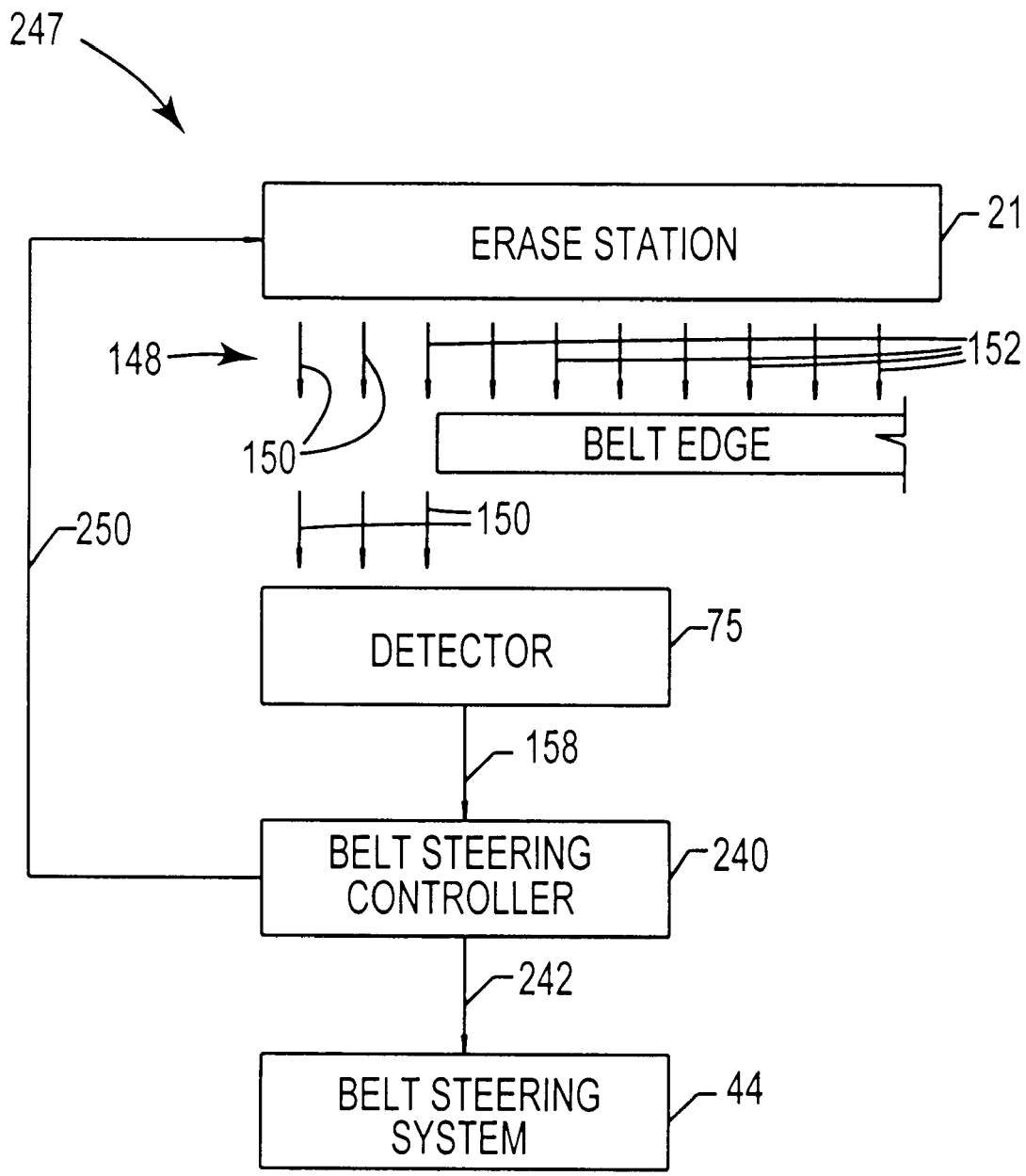
FIG. 13 is a functional block diagram illustrating another exemplary embodiment of a combination belt erase and belt registration system for use with an electrophotographic imaging system in accordance with the present invention.

In FIG. 13, a functional block diagram illustrating another embodiment of combination erase and belt position detection system 20 and belt steering system 44 in accordance with the present invention is generally shown at 247. In the exemplary embodiment shown, erase station 21 also employs a pulsed light source, and belt position detection system 22 operates as a synchronous detection system. The belt steering controller 241 provides a pulse input signal to light source 138 (and/or light source 140) within erase station 21, as indicated by interface 250. The belt steering controller 241 operates to synchronize light source 138 (and/or light source 140), when pulsed, with the output signal 242 to belt steering system 44.

Figure 14:
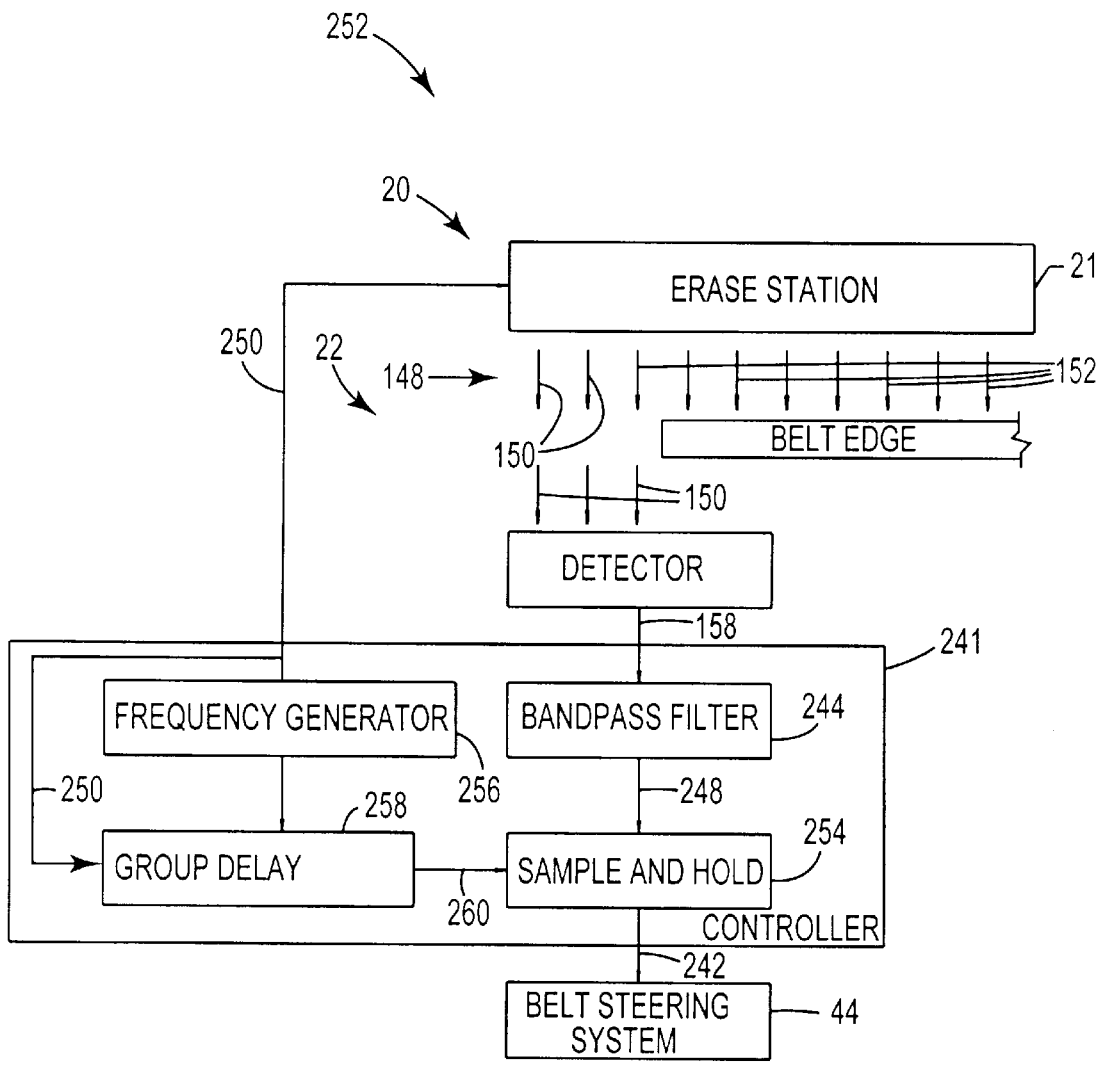
FIG. 14 is a functional block diagram illustrating another exemplary embodiment of a combination belt erase and belt registration system for use with an electrophotographic imaging system in accordance with the present invention.

In FIG. 14, a functional block diagram illustrating one exemplary embodiment of a combination erase station and synchronous belt position detection system 20 and belt steering system 44 in accordance with the present invention which is generally shown at 252. In this embodiment, the belt steering controller 241 includes band pass filter 244, a sample and hold circuit 254, a frequency generator 256, and a group delay 258. As previously described herein, the belt edge detection signal 158 is input to band pass filter 244, resulting in a sine wave output signal 248, the amplitude of which is representative of the position of the photoconductor belt 12 relative to the continuous transport path. The output signal 248 is input to sample and hold 254. Frequency generator 256 provides a pulsed input signal 250 to erase station 21 and group delay 258. Group delay 258 is coupled to sample and hold 254, indicated at 260. The group delay 258 and sample and hold 254 operate to delay the corresponding input signals 250 and 248 in order to provide compensation for the phase delay of the processed signal. This provides synchronization of the pulsed input signal 250 (from frequency generator 256 to pulsed light source 138 (or 140)) and the output signal 242 to belt steering system 44, which is representative of the position of the photoconductor belt 12 relative to a desired continuous path. Further, it is recognized that belt steering controller 241 or belt steering system 44 may include other control mechanisms, such as a pulse width modulator (PWM) for providing a desired output signal 242 to the belt steering system 44.

Figure 15:
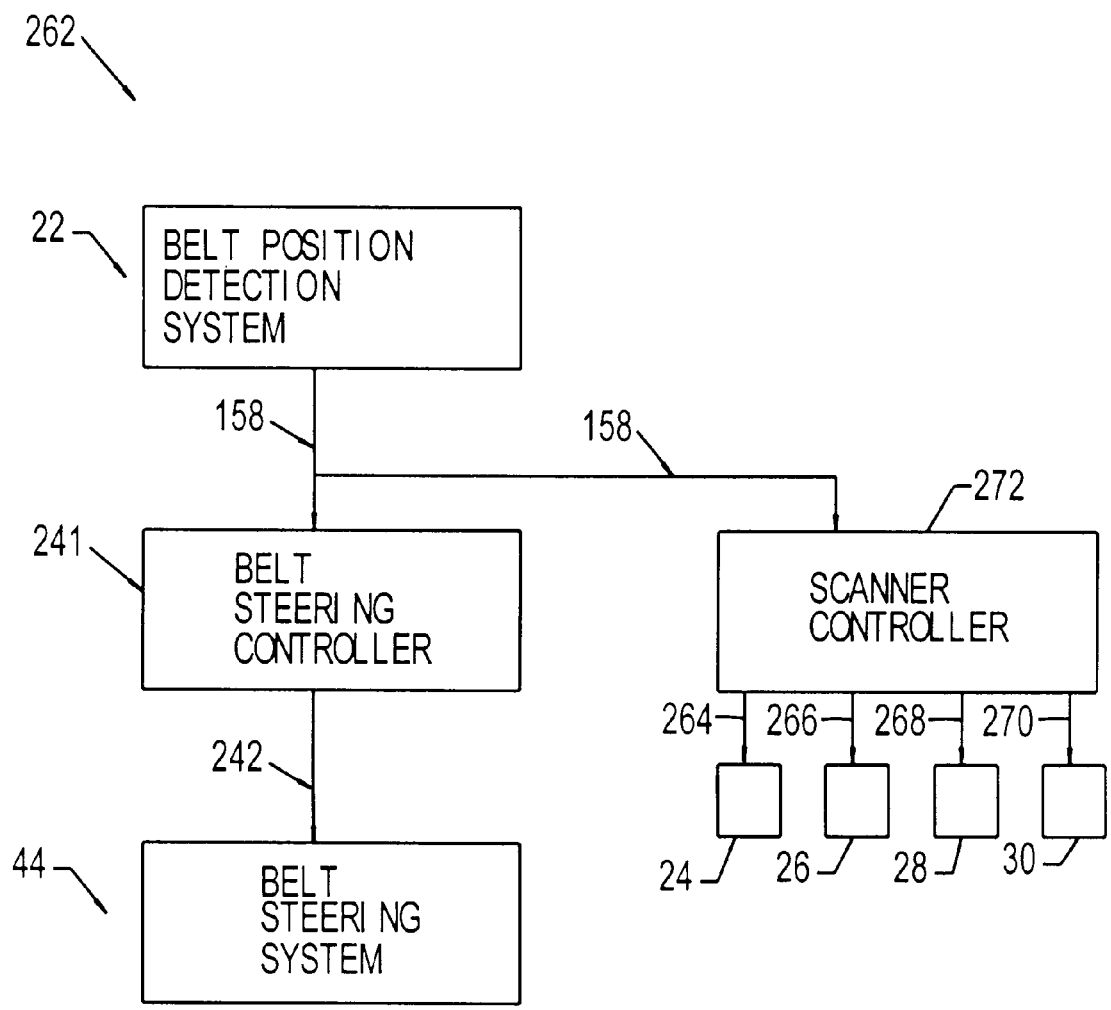
FIG. 15 is a functional block diagram illustrating one exemplary embodiment of a system for registration of one or more color separation images on a photoconductor belt in accordance with the present invention.

In FIG. 15, another block diagram showing a registration system in accordance with the present invention is generally indicated at 262. The output signals 158 from the belt position detection system 22 may be optionally output to a scanner controller 272 which controls the modulation of the laser scanners 24, 26, 28, 30, indicated at 264, 266, 268 and 270. Based on the detected position of photoconductor belt 12, the scanner controller 272 modulates the output signals to laser scanners 24, 26, 28 or 30 for precise registration of the latent images on the photoconductor belt 12.

In particular, the scanner controller 272 controls modulation of each laser beam 46, 48, 50, 52 based on the detected position to start each of the image scan segments at a fixed distance relative to the belt edge 62. By controlling belt steering and laser beam scanning relative to the belt edge 62, the registration system of the present invention maintains the image quality of the multi-color image transfer of the registered color separation images to output substrate 60.

Numerous characteristics and advantages of the invention have been set forth in the foregoing description. It will be understood, of course, that this disclosure is, and in many respects, only illustrative. Changes can be made in details, particularly in matters of shape, size and arrangement of parts without exceeding the scope of the invention. The invention scope is defined in the language in which the appended claims are expressed.

What is claimed is:

1. A system for registration of a photoconductor belt for use in an electrophotographic imaging system, the photoconductor belt being moved in a first direction along a transport path, the photoconductor belt tending to deviate from the transport path in a direction substantially perpendicular to the first direction, the system comprising:

an erase bar having only a substantially uniform nonimaging pattern of light extending laterally across the photoconductor belt substantially perpendicular to the first direction;

a photodetector disposed adjacent the photoconductor belt, wherein the photodetector is responsive to the light from the erase bar and provides a belt position signal representative of the position of the photoconductor belt relative to the transport path, in a direction substantially perpendicular to the first direction;

a belt steering mechanism operable coupled to the photoconductor belt for adjusting movement of the photoconductor belt in the direction substantially perpendicular to the first direction; and a belt steering controller responsive to the belt position signal for controlling the belt steering mechanism based on the belt position signal deviation of the photoconductor belt from the transport path.

2. The system of claim 1, wherein the photodetector extends from an edge of the photoconductor belt, the erase bar including a first portion overlapping the edge of the photoconductor belt opposite the photodetector, wherein the first portion is in optical alignment with the photodetector.

3. The system of claim 2, wherein the erase bar further comprises:

an optical fiber;

a uniform light extraction mechanism along the length of the optical fiber; and a light source operably coupled to the optical fiber.

4. The system of claim 3, wherein the uniform light extraction mechanism is an overlay light extraction mechanism.

5. The system of claim 3, wherein the uniform light extraction mechanism is light extraction tape.

6. The system of claim 3, wherein the light source comprises a light emitting diode.

7. The system of claim 3, wherein the light source comprises an incandescent light.

8. The system of claim 3, wherein the light source comprises a fluorescent light.

9. The system of claim 3, wherein the light source comprises a laser diode.

10. The system of claim 3, wherein the light source is a pulsed light source.

11. The system of claim 10, wherein the pulsed light source comprises the light source being driven by a pulse generator.

12. The system of claim 11, wherein the light source comprises a light emitting diode.

13. The system of claim 11, wherein the light source comprises an incandescent light.

14. The system of claim 10, wherein the pulsed light source is pulsed at a frequency different than 60 hertz.

15. The system of claim 10, wherein the pulsed light source is pulsed at a frequency greater than 60 hertz.

16. The system of claim 2, wherein the erase bar further comprises:

an optical fiber;

means for uniform light extraction along the length of the optical fiber; and a light source operably coupled to the optical fiber.

17. The system of claim 1, further comprising a plurality of rollers, wherein the photoconductor belt moves along the transport path about the plurality of rollers, and wherein the belt steering mechanism includes a roller adjustment mechanism for adjusting a position of one of the rollers, wherein the photoconductor belt tends to move in the direction substantially perpendicular to the first direction in response to the adjustment of the position of one of the rollers.

18. A system for registration of a latent image on a photoconductor belt, wherein the photoconductor belt is moved in a first direction along a transport path, and wherein the photoconductor belt tends to deviate from the transport path in a direction substantially perpendicular to the first direction, the system comprising:

a scanner for scanning a laser beam across the photoconductor belt;

a scan controller for modulating the laser beam based on image data to form the latent image on the photoconductor belt;

an erase bar having a pattern of light extending laterally across the photoconductor belt and substantially perpendicular to the first direction; and a photodetector disposed adjacent the photoconductor belt, wherein the photodetector is responsive to the light from the erase bar and provides a belt position signal representative of the position of the photoconductor belt relative to the transport path, in a direction substantially perpendicular to the first direction.

19. The system of claim 18, wherein the scan controller is responsive to the belt position signal and modulates the laser beam based on the belt position signal for registration of the latent images on the photoconductor belt.

20. The system of claim 19, wherein the erase bar extends from an edge of the photoconductor belt, the erase bar including a first portion overlapping a side of the photoconductor belt opposite the photodetector, wherein the first portion is in optical alignment with the photodetector.

21. The system of claim 18, further comprising:

a belt steering mechanism operably coupled to the photoconductor belt for adjusting movement of the photoconductor belt in the direction substantially perpendicular to the first direction; and a belt steering controller responsive to the belt position signal for controlling the belt steering mechanism based on the belt position signal to reduce deviation of the photoconductor belt from the transport path.

22. The system of claim 21, further comprising a plurality of rollers, wherein the photoconductor belt moves along the transport path about the plurality of rollers, and wherein the belt steering mechanism includes a roller adjustment mechanism for adjusting a position of one of the rollers, wherein the photoconductor belt tends to move in the direction substantially perpendicular to the first direction in response to the adjustment of the position of one of the number of rollers.

23. The system of claim 18, wherein the erase bar further comprises:

an assembly having an optical fiber; and a light source operably coupled to the optical fiber.

24. The system of claim 23, wherein the assembly further comprises a uniform light extraction mechanism along the length of the optical fiber.

25. The system of claim 24, wherein the uniform light extraction mechanism includes light extraction tape.

26. The system of claim 24, wherein the uniform light extraction mechanism is formed integral with the optical fiber.

27. The system of claim 22, wherein the light source comprises a light emitting diode.

28. The system of claim 23, wherein the light source comprises a linear array of light emitting diodes.

29. The system of claim 23, wherein the light source comprises an incandescent light.

30. The system of claim 23, wherein the light source comprises a fluorescent light.

31. The system of claim 23, wherein the light source is a pulsed light source.

32. The system of claim 31, wherein the pulsed light source comprises the light source being driven by a pulse generator.

33. The system of claim 31, wherein the pulsed light source is pulsed at a frequency different than 60 hertz.

34. The system of claim 31, wherein the pulsed light source is pulsed at a frequency different than 60 hertz.

35. An erase apparatus for use in reducing photoconductor charge in an image reproduction system including a photoconductor having an imaging region, the apparatus comprising:

an optical fiber having a first end and a second end, the optical fiber extending laterally across the imaging region in a direction substantially perpendicular to the direction of movement of the photoconductor, and including a first section facing the photoconductor and extending laterally across the photoconductor, and a second section adjacent to the first section;

a first light source operably coupled to the optical fiber at the first end; and a light extraction mechanism along the length of the second section of the optical fiber for redirecting light propagating along the optical fiber radially from the optical fiber through the first section onto the photoconductor, providing controlled light distribution on the photoconductor.

36. The apparatus of claim 35, wherein the light extraction mechanism comprises an overlay.

37. The apparatus of claim 36, wherein the light extraction mechanism comprises light extraction tape.

38. The apparatus of claim 36, further comprising a second light source operably coupled to the optical fiber at the second end.

39. The apparatus of claim 36, further comprising a reflector mechanism operably coupled to the optical fiber second end.

40. The apparatus of claim 39, wherein the reflector mechanism includes a specular reflector.

41. The apparatus of claim 39, wherein the reflector mechanism includes a non-specular reflector.

42. The apparatus of claim 36, further comprising a holder for air coupling the first light source to the first end.

43. The apparatus of claim 36, wherein the image reproduction system is an electrophotographic imaging system.

44. The apparatus of claim 36, wherein the image reproduction system is a copier.

45. The apparatus of claim 36, wherein the controlled light distribution is substantially uniform across the photoconductor.

46. The apparatus of claim 35, wherein the light extraction mechanism is formed integral with the optical fiber.

47. The apparatus of claim 35, wherein the light extraction mechanism includes a structured surface, wherein the structured surface operates to control light distribution on the photoconductor.

48. The apparatus of claim 47, wherein the structured surface includes a plurality of optical elements across the light extraction mechanism.

49. The apparatus of claim 48, wherein the optical elements are equally spaces across the light extraction mechanism.

50. The apparatus of claim 48, wherein the light extraction mechanism includes a first end, a second end, and a central portion, wherein the optical elements are spaced further apart near the first end and the second end of the light extraction mechanism relative to the spacing of the optical elements in the central portion.

51. The apparatus of claim 48, wherein the light extraction mechanism includes a first end, a second end, and a central portion, wherein the optical elements are shorter in length near the first end and the second end of the light extraction mechanism relative to the length of the optical elements in the central portion.

* * * * *